US009693072B2

(12) United States Patent
Inada et al.

(10) Patent No.: US 9,693,072 B2
(45) Date of Patent: Jun. 27, 2017

(54) MOVING PICTURE COMPRESSION APPARATUS, IMAGE PROCESSING APPARATUS, MOVING PICTURE COMPRESSION METHOD, IMAGE PROCESSING METHOD, AND DATA STRUCTURE OF MOVING PICTURE COMPRESSION FILE

(71) Applicant: Sony Computer Entertainment Inc., Tokyo (JP)

(72) Inventors: Tetsugo Inada, Kanagawa (JP); Akio Ohba, Kanagawa (JP); Hiroyuki Segawa, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 324 days.

(21) Appl. No.: 14/366,498

(22) PCT Filed: Oct. 24, 2012

(86) PCT No.: PCT/JP2012/006822
§ 371 (c)(1),
(2) Date: Jun. 18, 2014

(87) PCT Pub. No.: WO2013/099076
PCT Pub. Date: Jul. 4, 2013

(65) Prior Publication Data

US 2015/0124883 A1 May 7, 2015

(30) Foreign Application Priority Data

Dec. 27, 2011 (JP) ................................ 2011-286969

(51) Int. Cl.
*H04N 19/124* (2014.01)
*H04N 19/51* (2014.01)
(Continued)

(52) U.S. Cl.
CPC ........... *H04N 19/51* (2014.11); *H04N 19/105* (2014.11); *H04N 19/137* (2014.11); *H04N 19/14* (2014.11);
(Continued)

(58) Field of Classification Search
CPC ...... H04N 19/176; H04N 19/61; H04N 19/44; H04N 19/51; H04N 19/124; H04N 19/50;
(Continued)

(56) References Cited

U.S. PATENT DOCUMENTS 5,936,673 A * 8/1999 Agarwal ............. H04N 19/119 375/240.14
6,320,981 B1 11/2001 Yada
(Continued)

FOREIGN PATENT DOCUMENTS

CN 102165515 A 8/2011
JP 1998326464 A 12/1998
(Continued)

OTHER PUBLICATIONS

European Search Report for corresponding EP Application No. 12862302.2-1908, dated Jul. 17, 2015.
(Continued)

*Primary Examiner* — Dave Czekaj
*Assistant Examiner* — Kehinde O Abimbola
(74) *Attorney, Agent, or Firm* — Matthew B. Dernier LLP

(57) ABSTRACT

A frame sequence of moving picture data is divided into a tile image sequence, and the color space of the tile image sequence is converted to generate a YCbCr image sequence. Each frame is reduced to ½ time in the vertical and horizontal directions, and a compression process is carried out to generate compression data of a reference image. The compression data of the reference image is decoded and decompressed similarly as upon image display to restore a
(Continued)

YCbCr image as the reference image, and a difference image sequence is generated from the reference image and the original YCbCr image. Then, compression data of a difference image is generated, and compression data obtained by connecting the compression data of the reference image and the compression data of the difference image is generated for every four frames of a tile image.

15 Claims, 20 Drawing Sheets

(51) Int. Cl.
*H04N 19/174* (2014.01)
*H04N 19/587* (2014.01)
*H04N 19/59* (2014.01)
*H04N 19/105* (2014.01)
*H04N 19/593* (2014.01)
*H04N 19/14* (2014.01)
*H04N 19/137* (2014.01)
*H04N 19/426* (2014.01)
*H04N 19/196* (2014.01)
*H04N 19/167* (2014.01)

(52) U.S. Cl.
CPC ......... *H04N 19/174* (2014.11); *H04N 19/198* (2014.11); *H04N 19/428* (2014.11); *H04N 19/587* (2014.11); *H04N 19/59* (2014.11); *H04N 19/593* (2014.11); *H04N 19/167* (2014.11)

(58) Field of Classification Search
CPC .. H04N 19/513; H04N 19/105; H04N 19/109; H04N 19/186; H04N 9/8042; H04N 5/85; H04N 9/8063; H04N 9/8205; H04N 13/0003; H04N 13/0037; H04N 13/0048; H04N 13/0051; H04N 13/0055; H04N 13/0059
See application file for complete search history.

(56) References Cited

U.S. PATENT DOCUMENTS 6,473,463 B2 * 10/2002 Agarwal .............. H04N 19/119 375/240.16
6,563,999 B1 5/2003 Suzuoki
6,571,015 B1 5/2003 Matsuo
8,724,914 B2 5/2014 Inada
8,878,869 B2 11/2014 Inada
2001/0022815 A1 * 9/2001 Agarwal .............. H04N 19/119 375/240.16
2003/0053662 A1 * 3/2003 Evoy .................. G06K 9/00221 382/115
2005/0237380 A1 * 10/2005 Kakii ..................... H04N 7/147 348/14.12
2007/0159552 A1 * 7/2007 Wang ................... H04N 19/507 348/439.1
2010/0118935 A1 * 5/2010 Kakii ..................... H04N 7/147 375/240.01
2011/0221780 A1 9/2011 Inada
2012/0075346 A1 * 3/2012 Malladi .................. H04N 19/46 345/660
2012/0268465 A1 10/2012 Inada
2013/0176211 A1 7/2013 Inada

FOREIGN PATENT DOCUMENTS

JP 11-075069 A 3/1999
JP 2003174649 A 6/2003
WO 0052936 A1 9/2000
WO 2006099082 A2 9/2006
WO 2010038337 A1 4/2010
WO 2011052117 A1 5/2011
WO 2012035691 A1 3/2012

OTHER PUBLICATIONS

Barnett B et al: "Motion-Compensated Visual Pattern Image Sequence Coding for Full-Motion Multisession Videoconferencing on Multimedia Workstations". Journal of Electronic Imaging. vol. 5. No. 2. pp. 129-143, (Apr. 1, 1996).
Zhe Yuan et al: "Generic video coding with abstraction and detail completion". Acoustics. Speech and Signal Processing. 2009. ICASSP 2009. IEEE International Conference On. IEEE. Piscataway. NJ. USA. pp. 901-904 (Apr. 19, 2009).
Simon Fenney: Texture Compression Using Low Frequency Signal Modulation, Imagination Technologies Ltd. Graphic Hardware; The Eurographics Association pp. 84-91, 133. (2003).
Office Action for corresponding CN Application No. 2012800702427, 25 pages, dated Dec. 27, 2016.
Office Action for corresponding Japanese Application No. 2011-286969, dated Dec. 2, 2014.
International Preliminary Report and Written Opinion for corresponding PCT Application No. PCT/JP2012/006822, dated Jul. 10, 2014.
International Search Report for corresponding PCT Application No. PCT/JP2012/006822, dated Jan. 8, 2013.

* cited by examiner

12
DISPLAY APPARATUS
44
DISPLAY PROCESSING PART
100
CONTROL PART
20
INPUTTING APPARATUS
40
WIRELESS INTERFACE
MAIN MEMORY
60
DISK DRIVE
54
STORAGE MEDIUM MOUNTING PART
52
HARD DISK DRIVE
50
10

80
84
82
t

INPUTTING APPARATUS 20
100a
CONTROL PART
120
TILE IMAGE SEQUENCE GENERATION SECTION
122
REFERENCE IMAGE COMPRESSION SECTION
124
DIFFERENCE IMAGE GENERATION SECTION
126
DIFFERENCE IMAGE COMPRESSION SECTION
128
COMPRESSION DATA GENERATION SECTION
50
HARD DISK DRIVE
130
MOVING PICTURE DATA STORAGE SECTION
132
DIVISION PATTERN STORAGE SECTION
134
COMPRESSION DATA STORAGE SECTION

REDUNDANT IN SPACE DIRECTION
REDUNDANT IN TIME DIRECTION
4×4×1
4×2×2
2×4×2
2×2×4
Y
CbCr
(A)
(B)
(C)
(D)

IDENTIFICATION NUMBER

11

12

13

14

408
P
P0
P1
P2
P3
S50
0 or 1 or 2 or 3
S52
4bit
->
8bit
P0'
P1'
P2'
P3'

418
416
422
412
426
420
414
4B
424
410
4B
411
(null)
(null)
(null)
4B

INPUTTING APPARATUS 20
HARD DISK DRIVE 50
100b
CONTROL PART
502
INPUT INFORMATION ACQUISITION SECTION
504
INFORMATION PROCESSING SECTION
506
LOADING SECTION
MAIN MEMORY 60
DISPLAY IMAGE PROCESSING SECTION
DATA READING OUT PORTION
DECODING PORTION
RENDERING PORTION
508
510
512
514
DISPLAY PROCESSING PART 44

MOVING PICTURE COMPRESSION APPARATUS, IMAGE PROCESSING APPARATUS, MOVING PICTURE COMPRESSION METHOD, IMAGE PROCESSING METHOD, AND DATA STRUCTURE OF MOVING PICTURE COMPRESSION FILE

TECHNICAL FIELD

The present invention relates to an image processing technology for displaying an image including a moving picture.

BACKGROUND ART

An entertainment system for home use which not only executes a game program but also can reproduce a moving picture has been proposed. In the entertainment system for home use, a GPU generates a three-dimensional image using a polygon (refer to, for example, PTL 1).

It always is a significant issue how efficiently an image is displayed irrespective of whether the image is a moving picture or a still image. Therefore, various technologies have been developed and placed into practical use in various fields such as a compression technology, a transmission technology, an image processing technology and a displaying technology of image data, and it has become possible for high definition images to be enjoyed familiarly in a variety of situations.

CITATION LIST

Patent Literature

[PTL 1]
U.S. Pat. No. 6,563,999 A

SUMMARY

Technical Problem

A request to display a high-definition image in a high responsibility to a variation or the like of the angle of view by a viewpoint movement by a user or a progress of a game always exists. For example, in order to implement image display which has a degree of freedom with respect to the point of view such as to display a region to which a user desires to pay attention from within an overall displayed image in an enlarged scale or to move to display a different region, in a high responsibility, also it is necessary to make random access to image data of a large size possible while the image data of a large size are processed in a short time.

Specifically, in the case of a moving picture in which a large number of frames are displayed sequentially with respect to lapse of time, since the data size increases, generally the compression rate is prioritized. However, as the compression rate rises, the arithmetic operation cost upon decoding increases and the granularity of data access tends to increase. As a result, even when it is desired to display only a restricted region, it may become necessary to decode an overall area of a frame or deploy the overall area in a memory. This is disadvantageous in terms of the arithmetic operation cost and the memory cost.

The present invention has been made in view of such a problem as described above, and the object of the present invention resides in provision of an image processing technology which can display a moving picture in a high responsibility satisfying various requests.

Solution to Problem

A particular mode of the present invention relates to a moving picture compression apparatus. The moving picture compression apparatus includes: a tile image sequence generation section configured to generate a tile image sequence configured by dividing a frame sequence, which configures moving picture data, on an image plane; a reference image compression section configured to compress the tile image sequence to generate compression data of a reference image; a difference image generation section configured to generate a difference image sequence configured from difference images which represent a difference between tile images configuring the tile image sequence and images obtained by decoding the compression data of the reference image generated by the reference image compression section and corresponding to the tile images; a difference image compression section configured to compress the difference image sequence in units of data blocks obtained by dividing the difference image sequence on the image plane and a time axis to generate compression data of the difference images; and a compression data generation section configured to generate moving picture compression data including the compression data of the reference image and the compression data of the difference images in tile image units of a predetermined number of frames and output the moving picture compression data to a storage apparatus.

Another mode of the present invention relates to a data image processing apparatus. The image processing apparatus includes: an information processing section configured to successively calculate a frame to be displayed from within a frame sequence which configures moving picture data and a region to be displayed in the frame; a loading section configured to load, from a storage apparatus in which moving picture compression data including compression data of a reference image obtained by compressing a tile image sequence obtained by dividing the frame sequence on an image plane and compression data of a difference image representative of a difference between an image obtained by decoding the compression data of the reference image and the corresponding tile image are stored, the moving picture compression data in units of tile images into a memory based on the information calculated by the information processing section; a display image processing section configured to read out, from within the moving picture compression data loaded in the memory, moving picture compression data calculated by the information processing section and including a region to be displayed from within the frame to be displayed and decode and add the compression data of the reference image and the compression data of the difference image to sequentially render an image of the region to be displayed; and a display section configured to sequentially display the rendered images.

A further mode of the present invention relates to a moving picture compression method. The moving picture compression method includes: by a moving picture compression apparatus, a step of generating a tile image sequence configured by dividing a frame sequence, which is stored in a storage apparatus and configures moving picture data, on an image plane; a step of compressing the tile image sequence to generate compression data of a reference image; a step of generating a difference image sequence configured from difference images which represent a difference between tile images which configure the tile image sequence and images obtained by decoding the compression data of the generated reference image and corresponding to the tile images; a step of compressing the difference image sequence in units of data blocks obtained by dividing the difference image sequence on the image plane and a time axis to generate compression data of the difference images; and a step of generating moving picture compression data including the compression data of the reference image and the compression data of the difference images in tile image units of a predetermined number of frames and outputting the moving picture compression data to the storage apparatus.

A still further mode of the present invention relates to an image processing method. The image processing method includes: by an image processing apparatus, a step of successively calculating a frame to be displayed from within a frame sequence which configures moving picture data and a region to be displayed in the frame; a step of loading, from a storage apparatus in which moving picture compression data including compression data of a reference image obtained by compressing a tile image sequence obtained by dividing the frame sequence on an image plane and compression data of a difference image representative of a difference between an image obtained by decoding the compression data of the reference image and the corresponding tile image are stored, the moving picture compression data in units of tile images into a memory based on the information calculated by the calculating step; a step of reading out, from within the moving picture compression data loaded in the memory, moving picture compression data calculated by the calculating step and including a region to be displayed from within the frame to be displayed and decoding and adding the compression data of the reference image and the compression data of the difference image to sequentially render an image of the region to be displayed; and a step of sequentially displaying the rendered images.

A yet further mode of the present invention relates to a data structure of a moving picture compression file. In the data structure, compression data of a reference image obtained by compressing tile images, which configure a tile image sequence obtained by dividing a frame sequence which configures moving picture data on an image plane, in units of data blocks obtained by dividing the tile images on the image plane and a time axis and compression data of a difference image obtained by compressing a difference image sequence, which is configured from difference images representative of a difference between an image obtained by decoding the compression data of the reference image and the corresponding tile image, in units of data blocks obtained by dividing the difference image sequence on the image plane and the time axis, are associated with each other in units of tile images of a predetermined number of frames. In an image processing apparatus, the compression data of the reference image and the compression data of the difference image of the data block loaded in the tile image units based on information of the frame to be displayed and a region to be displayed in the frame and corresponding to the region to be displayed from within the frame to be displayed are decoded and added to be used to sequentially render an image of the region to be displayed.

It is to be noted that also arbitrary combinations of the components described above and representations of the present invention obtained by conversion between different ones of a method, an apparatus, a system, a computer program and so forth are effective as modes of the present invention.

Advantageous Effect of Invention

According to the present invention, three-dimensional data output which can be randomly accessed and exhibit a high through-put can be performed.

DESCRIPTION OF EMBODIMENTS

Figure 1:
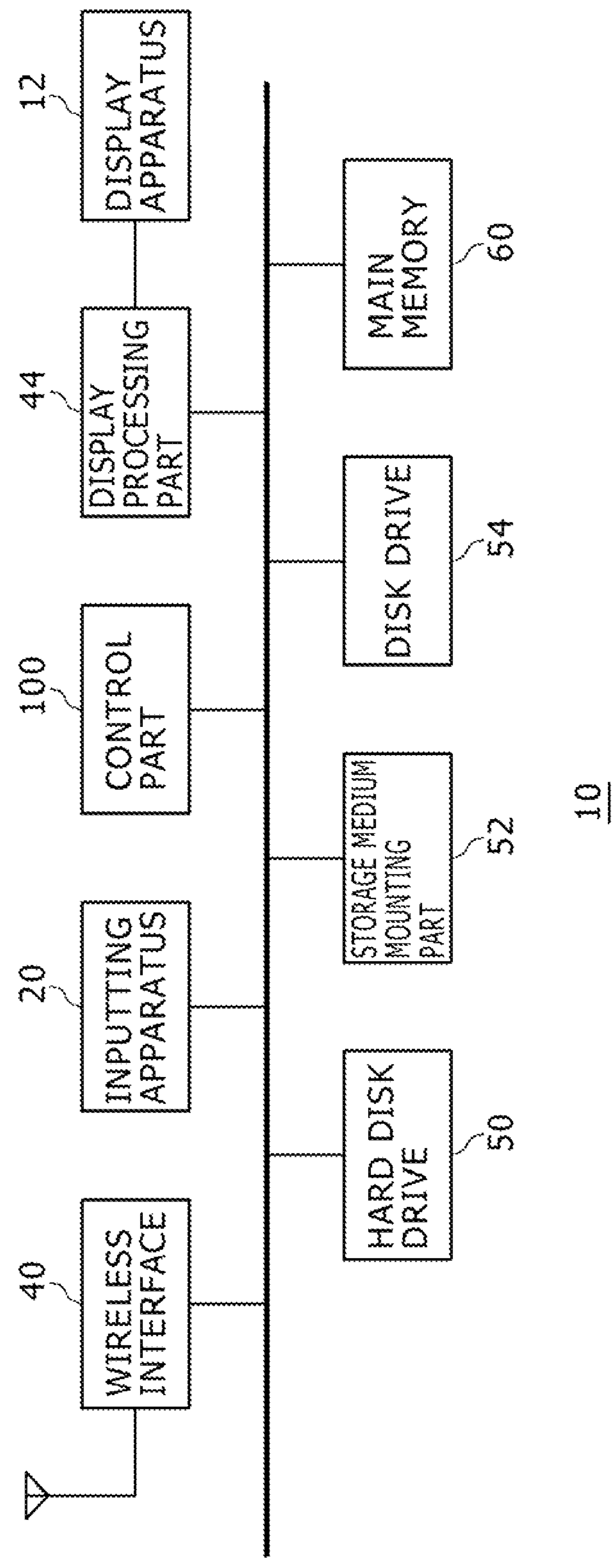
FIG. 1 is a view depicting a configuration of an image processing apparatus according to an embodiment.

In the present embodiment, a moving picture is displayed for random access thereto on an image plane and with respect to a time axis without increasing the arithmetic operation cost and the memory cost. A moving picture taken as a display target here may be a movie, an animation or a moving picture or the like picked up by a user, which themselves make principal contents, or may be a moving picture represented as a member of an image such as a video texture which is mapped in computer graphics of a game or the like.

In the case of a still image, as a compression method, JPEG (Joint Photographic Experts Group), S3TC (S3 Texture Compression) and so forth have been placed into practical use. The former exhibits a high compression rate although the memory cost becomes comparatively high because data of a decoding target needs to be deployed in a memory upon display. The latter is comparatively low in compression rate. However, since it requires no deployment of decoded data, particularly where an image is locally displayed, the memory cost is low. Accordingly, one of the compression methods can be selected suitably in response to a priority order of the compression rate and the memory load which depend upon the display environments and so forth.

Meanwhile, conventionally a compression method for a moving picture gives rise to such a problem as described below because MPEG (Moving Picture Experts Group), AVC (Advanced Video Coding) and so forth have emphasized to raise the compression rate. In particular, where a moving picture is used as a video texture, even when only a portion of the moving picture is to be mapped, the overall area needs to be deployed in a memory, which requires a useless memory cost. This similarly applies to, not only a video texture, but also such a case that only a portion of a moving picture is displayed in an enlarged scale.

Especially, in the case of an inter-frame predictive coding method, also a reference image needs to be deployed over an overall area in a memory. Further, originating from a high compression rate, also the arithmetic operation cost for decoding data over an overall area is high. Furthermore, even within a period within which a region expressed by the video texture is outside the angle of view, decoding must be continued in preparation for subsequent entering into the angle of view. Therefore, even from this point, the processing cost and the memory cost for decoding are required uselessly.

Therefore, in the present embodiment, data of a moving picture is compressed such that, even if the data of the moving picture is stored into a memory while it remains in a compressed state, it is possible to extract only data in a necessary region and decode and display the data independently thereby to reduce the arithmetic operation cost and the memory cost. At this time, the data of the moving picture is compressed taking a redundancy in a frame or between frames into consideration so that high picture quality and a high compression rate are implemented with the contents of the image taken into consideration.

First, a technology for generating compression data of a moving picture in the present embodiment is described. FIG. 1 depicts a configuration of an image processing apparatus of the present embodiment. The image processing apparatus 10 includes a wireless interface 40, an inputting apparatus 20, a display processing part 44, a display apparatus 12, a hard disk drive 50, a recording medium mounting part 52, a disk drive 54, a main memory 60 and a control part 100.

The display apparatus 12 includes one of general display units such as a liquid crystal display unit, an EL (Electronic Luminescence) display unit and a plasma display unit. The display apparatus 12 may be provided integrally with some other module of the image processing apparatus 10 or may be connected by wire or wireless connection by using a wire cable, a wireless LAN (Local Area Network) or the like. The display processing part 44 has a frame memory (not shown) for buffering data to be displayed on the display unit of the display apparatus 12.

The wireless interface 40 is configured such that it can receive various kinds of data such as image data from a server by wirelessly connecting the wireless interface 40 to an external apparatus or a network in accordance with a predetermined wireless communication protocol. The inputting apparatus 20 is configured from a common inputting apparatus such as a joystick, a touch panel, a mouse, a keyboard, buttons and so forth. The inputting apparatus 20 includes operation means for accepting a request of a user such as selection of image data of a processing target, starting of generation of compression data or the like. Various requesting signals inputted from the user to the inputting apparatus 20 are supplied to the control part 100.

The hard disk drive 50 functions as a storage apparatus for storing data. Various kinds of data received from the server are stored once into the hard disk drive 50. The recording medium mounting part 52 reads out, when a removable recording medium such as a memory card is mounted thereon, data from the removable recording medium. The disk drive 54 drives, when a ROM disk for read-only use is mounted thereon, the ROM disk and recognizes the same to read out data. The ROM disk may be an optical disk, a magneto-optical disk or the like. Various kinds of data such as image data may be stored in those recording media.

The control part 100 includes a multi-core CPU, and one processor core for universal use and a plurality of simple processor cores are provided in the one CPU. The processor core for universal use is called PPU (PowerPC Processor Unit) while the remaining processor cores are each called SPU (Synergistic Processor Unit). The PPU has a register, and includes a main processor as an entity for execution of arithmetic operation and efficiently allocates tasks as basic processing units of an application to be executed to the SPUs. It is to be noted that the PPU itself may execute tasks. Each SPU has a register and includes a sub processor as an entity for execution of arithmetic operation and a local memory as a local storage area.

The main memory 60 is a storage apparatus and is configured as a RAM (Random Access Memory). Each SPU has a DMA (Direct Memory Access) controller for exclusive use as a control unit and can implement high-speed data transfer between the frame memory of the display processing part 44 and the main memory 60. The control part 100 in the present embodiment implements a high-speed image processing function by causing a plurality of SPUs to operate in parallel to each other. The display processing part 44 is connected to the display apparatus 12 and outputs image data of a menu screen image and so forth.

Figure 2:
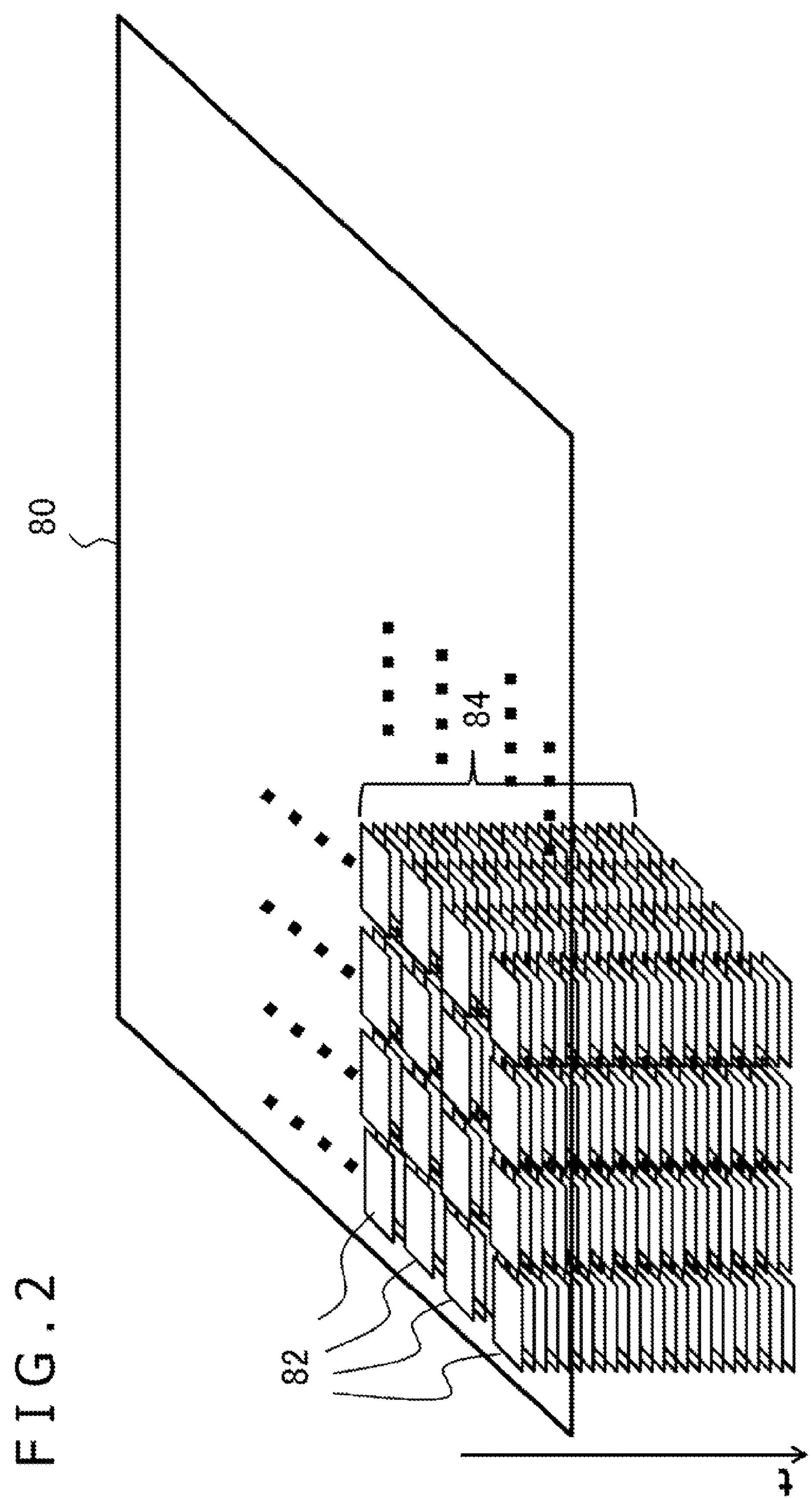
FIG. 2 is a view illustrating a processing unit of moving picture data in the present embodiment.

FIG. 2 is a view illustrating a processing unit of moving picture data in the present embodiment. In the present embodiment, image frames 80 which configure a moving picture of a compression target are each divided into a predetermined size to generate a plurality of tile images (for example, tile images 82). Since the image frames 80 of the moving picture configure an image sequence with respect to a time axis represented in a vertical direction in FIG. 2, also the tile images configure image sequences corresponding to the image sequence (for example, a tile image sequence 84). In the present embodiment, compression data is generated using a tile image sequence as a processing unit. Upon image display, decoded tile images are connected to each other as occasion demands to display an image. It is to be noted that, in the following description, also each of the tile images configuring the tile image sequence is referred to as "frame." It is to be noted that, where the number of pixels of an original image frame is smaller than a predetermined number or in a like case, division into tile images may not be performed by regarding the overall image frame as one tile.

Figure 3:
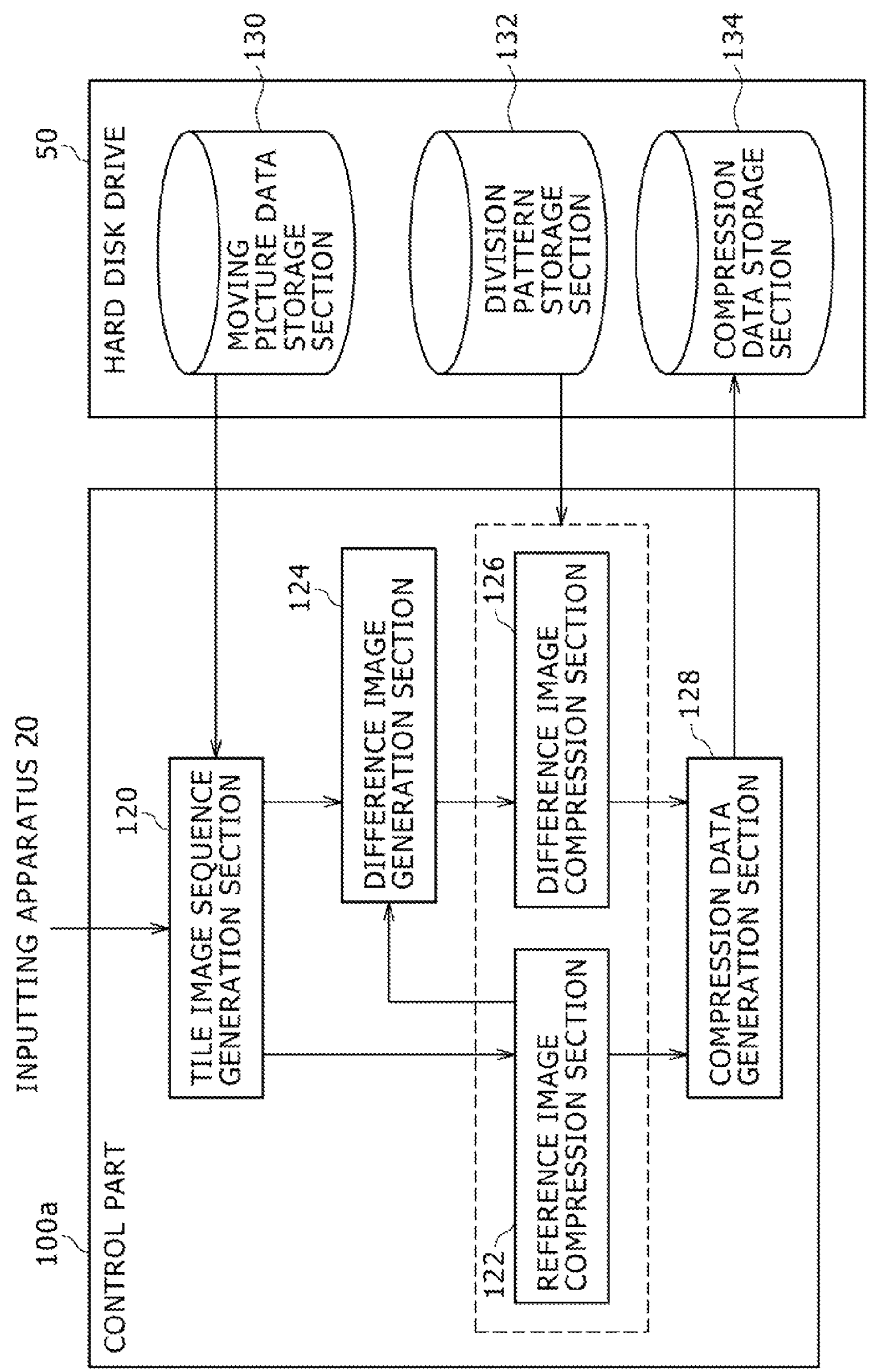
FIG. 3 is a view particularly depicting a configuration of a control part having a moving picture data compression function and a configuration of a hard disk drive in the present embodiment.

FIG. 3 particularly depicts a configuration of a control part 100*a* having a moving picture data compression function and a configuration of the hard disk drive 50 in the present embodiment. The control part 100*a* includes a tile image sequence generation section 120, a reference image compression section 122, a difference image generation section 124, a difference image compression section 126, and a compression data generation section 128. The tile image sequence generation section 120 generates a tile image sequence from moving picture data of a compression target and converts the color space from an RGB color space into a YCbCr color space. The reference image compression section 122 reduces frames after the conversion and compresses the frames into a reference image. The difference image generation section 124 generates difference images of the frames based on the reference image. The difference image compression section 126 compresses the difference images. The compression data generation section 128 generates final compression data which includes the compression data of the reference image and the compression data of the difference images.

Figure 21:
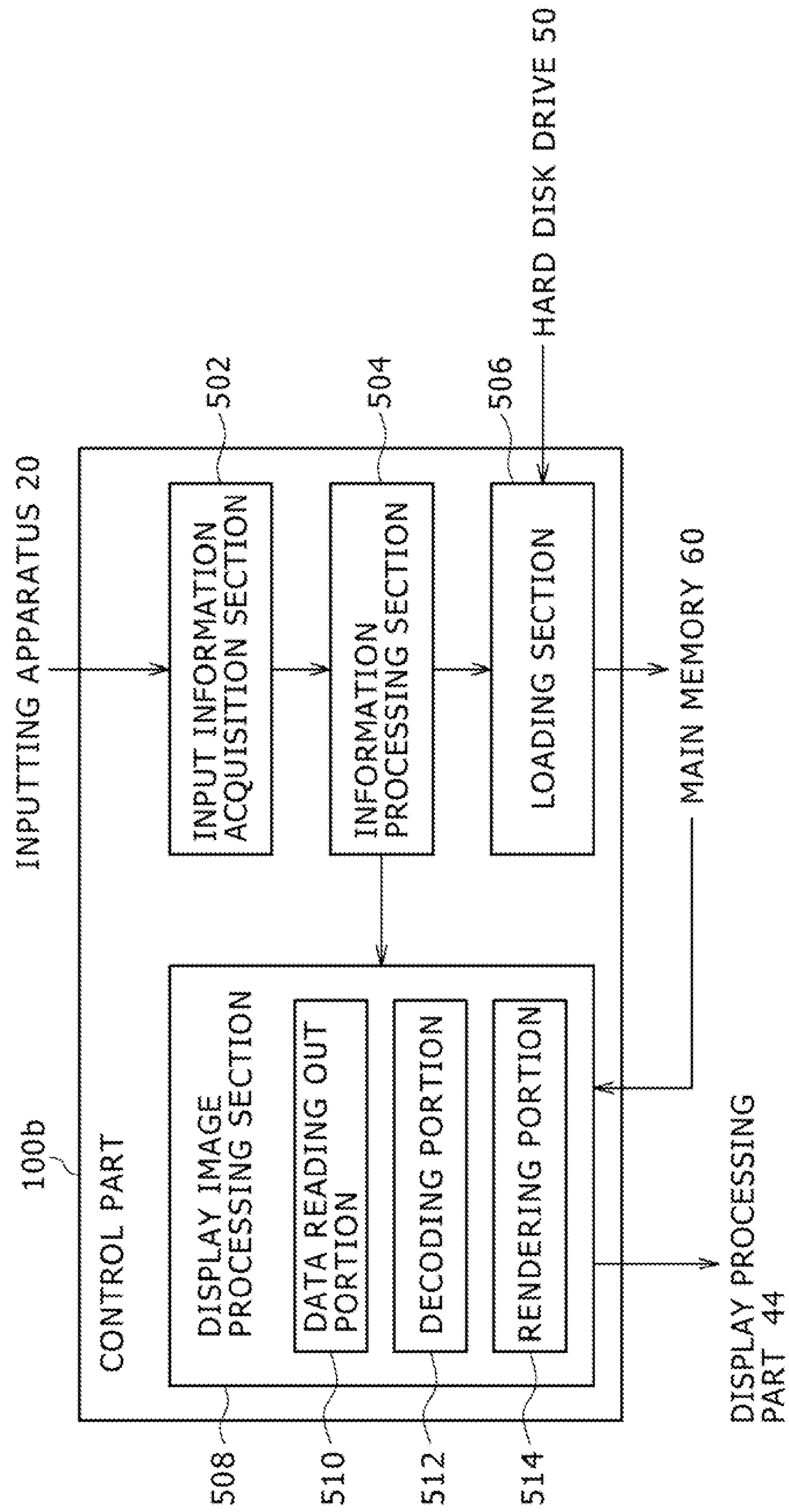
FIG. 21 is a view particularly depicting a configuration of a control part having an image displaying function in the present embodiment.

Referring to FIG. 3 and FIG. 21 which is hereinafter described, components described as functional blocks for carrying out various processes can be configured, in hardware, from a CPU (Central Processing Unit), a memory and other LSIs, and are implemented, in software, from a program loaded in the memory and so forth. As described hereinabove, the control part 100 has one PPU and a plurality of SPUs, and the PPU and the SPUs can individually configure the functional blocks singly or in combination. Accordingly, it can be recognized by those skilled in the art that the functional blocks can be implemented in various forms only by hardware, only by software or by a combination of hardware and software, and they are not limited to one of hardware, software and a combination.

The hard disk drive 50 includes a moving picture data storage section 130, a division pattern storage section 132 and a compression data storage section 134. The moving picture data storage section 130 has moving picture data of a compression target stored therein. The division pattern storage section 132 stores division patterns with which the reference image compression section 122 and the difference image compression section 126 form quantization units. The compression data storage section 134 stores compression data generated by the compression data generation section 128.

The tile image sequence generation section 120 acquires information designated by the user and relating to moving picture data of a compression target from the inputting apparatus 20 and sequentially reads out data of frames which configure the moving picture data from the moving picture data storage section 130. Then, the tile image sequence generation section 120 divides the frames into a predetermined size to generate a tile image sequence and converts RGB values which are the pixel values into a luminance Y and color differences Cb and Cr to generate a YCbCr image which has YCbCr values as pixel values. The conversion of a color space from an RGB color space into a YCbCr color space can be carried out applying an existing method.

The reference image compression section 122 reduces a tile image sequence generated by the tile image sequence generation section 120 at a predetermined rate and then compresses the reduced tile image sequence. In particular, the reference image compression section 122 divides the tile image sequence into predetermined sizes in a space direction and a time direction and quantizes data blocks after the division. Upon the quantization, the reference image compression section 122 carries out space-time division further for each data block with one of division patterns stored in the division pattern storage section 132 to form a quantization unit configured from data of a predetermined number of pixels. Although details are hereinafter described, since an optimum division pattern differs depending upon the contents of the image, the reference image compression section 122 selects an optimum pattern from among the plural division patterns stored in the division pattern storage section 132.

Then, the reference image compression section 122 carries out the quantization by generating, for each quantization unit, a pallet representing two representative values and an index which designates one of the two representative values and a plurality of intermediate values obtained by linear interpolation of the representative values as a pixel value. Data each configured from the pallet and the index are collected for each predetermined number of quantization units to form one storage unit.

The difference image generation section 124 calculates, for each corresponding pixels, a difference between each frame of a tile image sequence generated by the tile image sequence generation section 120 and a corresponding frame restored by decoding data of a reference image compressed by the reference image compression section 122 to generate a difference image of the tile image sequence. The difference image compression section 126 compresses the difference image of the tile image sequence generated by the difference image generation section 124.

A rough flow of the compression process is similar to that of the compression process described hereinabove carried out by the reference image compression section 122. However, since the range of pixel values of the reference image is restrictive, the compression process is configured such that the characteristic is reflected as an advantage on the data size or the efficiency of a rendering process. In particular, all pixel values of a data block configured only from pixel values whose absolute values are equal to or lower than a predetermined threshold value are regarded as 0. Further, as regards a pallet upon quantization, the number of hierarchies is lowered so as to represent four particular values so that linear interpolation is not carried out upon image display. Details are hereinafter described.

The compression data generation section 128 collects data of a reference image compressed by the reference image compression section 122 and data of difference images compressed by the difference image compression section 126 in predetermined units and then adds a pointer to each of the data to generate compression data so that the data can be referred to upon image display. The generated compression data are stored into the compression data storage section 134.

Figure 4:
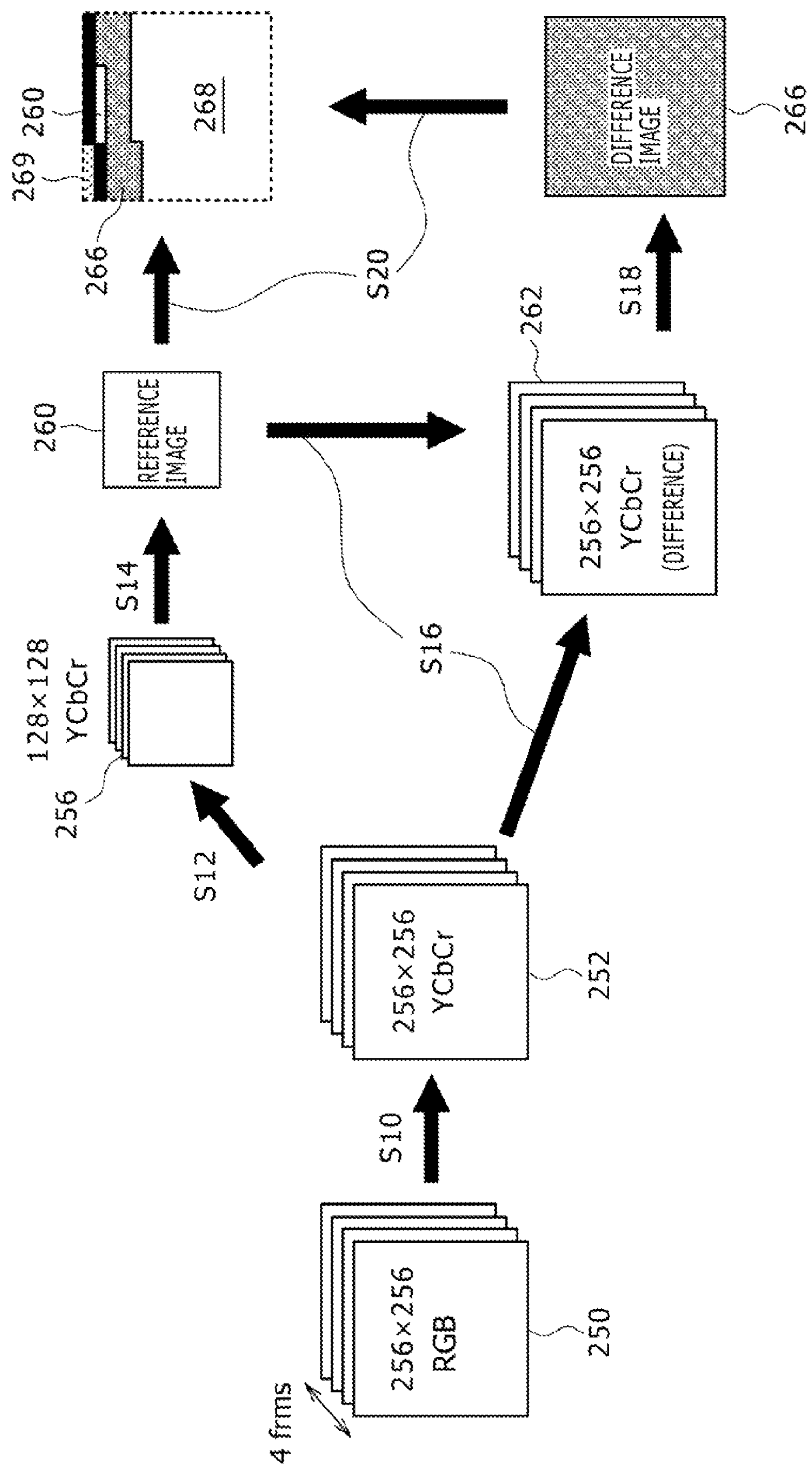
FIG. 4 is a view schematically illustrating a compression procedure of moving picture data carried out by the image processing apparatus including the control part in the present embodiment.

FIG. 4 schematically depicts a compression procedure of moving picture data carried out by the image processing apparatus 10 including the control part 100*a*. First, a frame sequence of moving picture data read out from the moving picture data storage section 130 is divided into a tile image sequence 250 by the tile image sequence generation section 120. Here, the tile image has a size of 256×256 pixels, and a later compression process is carried out for every four frames of tile images. Although the compression process is described below based on the example just described, the number of pixels of a tile image, the number of frames of a processing unit and a unit of a process carried out at the following stage can be variously changed.

Then, the tile image sequence generation section 120 converts the color space of the tile image sequence 250 from an RGB color space into a YCbCr color space to generate a YCbCr image sequence 252 having 256×256 pixels (S10). Then, the reference image compression section 122 reduces the frames of the YCbCr image sequence by multiplying them by ½ in the vertical and horizontal directions to generate a YCbCr image sequence 256 having 128×128 pixels (S12). Further, the reference image compression section 122 carries out a compression process in such a manner as hereinafter described in detail and successively collects quantization units to form storage units to generate compression data 260 of a reference image (S14).

On the other hand, the difference image generation section 124 decodes and decompresses the compression data 260 of the reference image similarly as in the case upon image display to restore a YCbCr image having 256×256 pixels as a reference image. Then, the difference image generation section 124 calculates a difference of the reference image from corresponding frames of the YCbCr image sequence 252 having 256×256 pixels and generated by the tile image sequence generation section 120 to generate a difference image sequence 262 of YCbCr of 256×256 pixels (S16).

Then, the difference image compression section 126 successively carries out a compression process in such a manner as hereinafter described in detail and collects quantization units to form a storage unit thereby to generate compression data 266 of the difference images (S18). Then, the compression data generation section 128 generates compression data 268 obtained by connecting the compression data 260 of the reference image and the compression data 266 of the difference images and stores the generated compression data into the compression data storage section 134 (S20).

In the compression data 268, pointer information is included as a header 269 so that a corresponding relationship between a position of a data block in a frame of an original moving picture and compression data can be found upon image display. The process in FIG. 4 is repetitively carried out for four frames of the overall remaining part of the image sequence. Further, by repetitively carrying out the process described above for later every four frames, the overall moving picture data are compressed.

Figure 5:
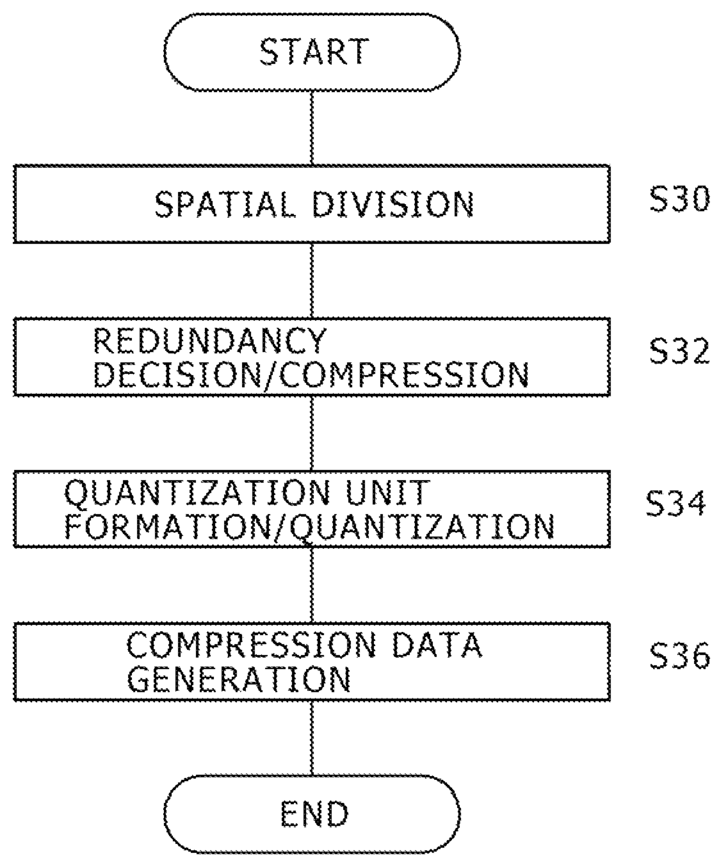
FIG. 5 is a flow chart illustrating a processing procedure for generating compression data of a reference image carried out by a reference image compression section in the present embodiment.

A compression data generation process for a reference image is described next with reference to FIGS. 5 to 15. FIG. 5 is a flow chart illustrating a processing procedure for generating compression data 260 of a reference image by the reference image compression section 122 at step S14 of FIG. 4. First, the YCbCr image sequence 256 for four frames reduced at step S12 of FIG. 4 is divided into a predetermined size in a space direction to generate data blocks of processing units (S30). Here, the space direction corresponds to a plane of the image. On the other hand, a time direction corresponds to the number of frames.

Then, presence or absence of some redundancy in the space direction and the time direction is confirmed for each data block, and, if it is decided that a redundancy exists, then data is compressed in the direction in which it is decided that a redundancy exists (S32). In particular, if a redundancy exists in the space direction, then the image is reduced. If a redundancy exists in the time direction, then a plurality of successive images are averaged to decrease the number of frames. Then, time-space division is performed with one of division patterns stored in the division pattern storage section 132 to form quantization units configured from an equal number of pixels and quantize the data (S34).

At this time, a YCbCr image is decomposed into a Y image in which a luminance Y is a pixel value and a CbCr image in which a vector value having color differences (Cb, Cr) as an element is a pixel value, and the CbCr image is reduced by a predetermined magnification. Then, quantization units are formed from the Y image and the CbCr image similarly as in the manner described above to individually quantize the images. As described hereinabove, the quantization is a process for representing pixel values included in a quantization unit by a pallet and an index.

As a result, one or more data of a quantization unit which includes a pallet and an index of the Y image and one or more data of a quantization unit which includes a pallet and an index of the CbCr image corresponding to the Y image are generated for each data block. Here, the number of those quantization units which configure one data block differs depending upon the compression amount at step S32. By collecting data generated in such a manner as described above for every predetermined number of quantization units to form a storage unit, compression data of the reference image for four frames of the original tile image is generated (S36).

Figure 6:
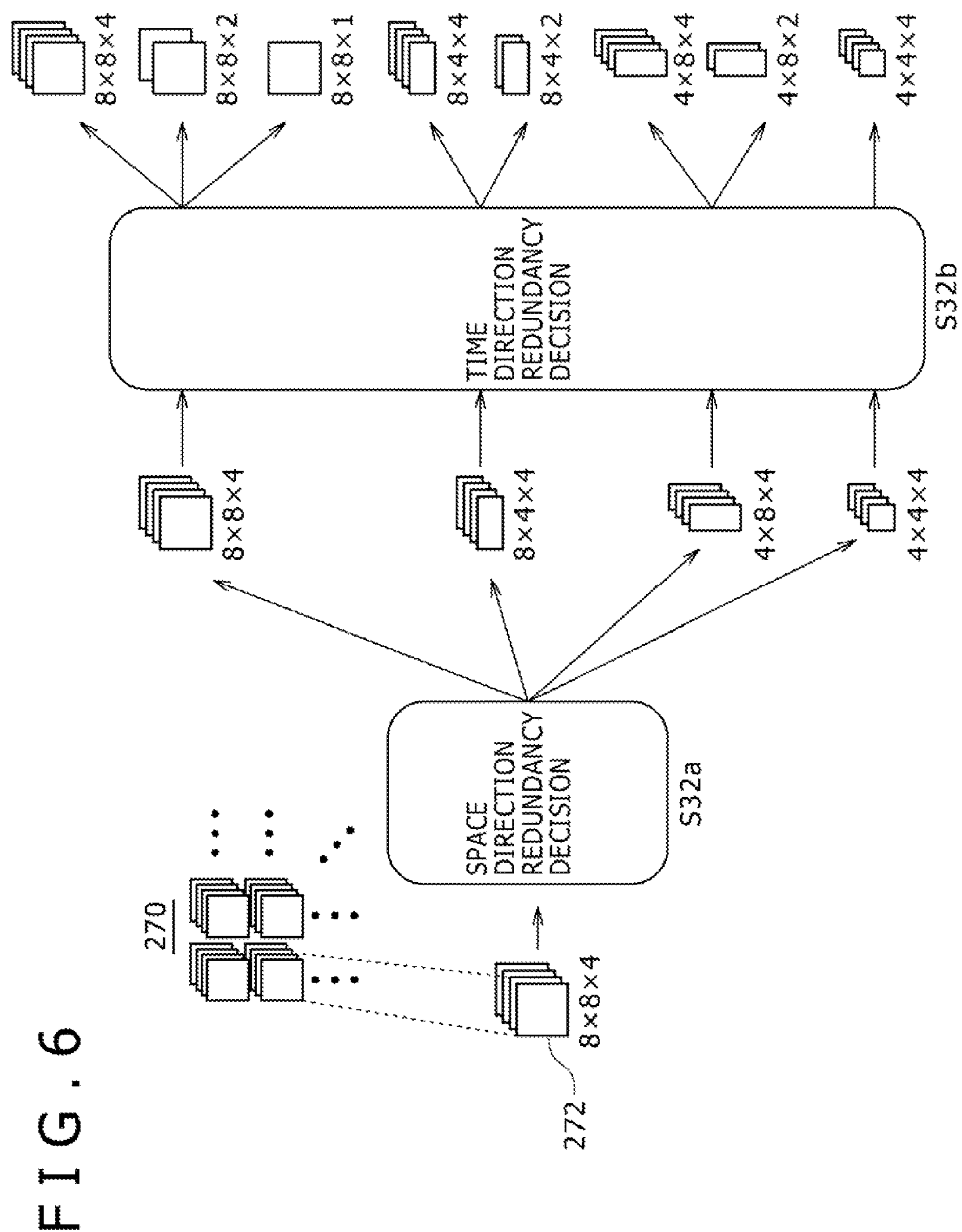
FIG. 6 is a view schematically illustrating a procedure for compressing a spatially divided tile image sequence by a redundancy decision in the present embodiment.

FIG. 6 schematically illustrates a procedure for compressing the tile image sequence spatially divided at step S30 of FIG. 5 by the redundancy decision at step S32. In the example of FIG. 6, the YCbCr image sequence is divided into 8×8 pixels to form data blocks at step S30. In particular, a YCbCr image for four frames having 128×128 pixels is divided into 16 blocks in both of the vertical and horizontal directions. In FIG. 6, a data size is indicated in the form of "number of pixels in the horizontal direction×number of pixels in the vertical direction×number of frames" below each data block. This similarly applies also to the succeeding figures.

The redundancy is decided for each of the data blocks 272 formed in such a manner as described above. In FIG. 6, a redundancy decision in a space direction is carried out first (S32*a*). In particular, the image is reduced by a predetermined magnification in a predetermined direction, and an image obtained by returning the size of the reduced image to the original size and the image before the reduction are compared with each other for each frame. If the sum total of the differences between the pixel values is equal to or lower than a threshold value, then it is decided that some redundancy exists in the space direction. The image is then compressed by reducing the same by a magnification with which the reduction amount is comparatively great from among those reduction magnifications with which the sum total is equal to or lower than the threshold value. In the example of FIG. 6, ½ in the vertical direction, ½ in the horizontal direction and ½ in the vertical and horizontal directions are set as candidates for the reduction magnification.

Accordingly, as depicted in FIG. 6, a case in which there is no redundancy in the original image and the image of 8×8 pixels remains as it is and different cases in which the image is reduced into 8×4 pixels, 4×8 pixels or 4×4 pixels appear depending upon the decision at step S32*a*. Since the decision is carried out in a group of every four frames, it may be determined that the original image can be reduced if it is found, when the sum total of the differences between pixel values is compared with the threshold value for every one frame, that the sum total is equal to or lower than the threshold value with regard to all of the four frames. Alternatively, a threshold value decision may be carried out for the sum total of the differences between pixel values for four frames.

Next, a redundancy decision in a time direction is carried out for the images placed in one of the four states described hereinabove (S32*b*). In particular, an image is generated by averaging a predetermined number of successive frames, and the generated image is compared with the image of the original frames. If the sum total of the differences between pixel values is equal to or lower than a threshold value, then it is decided that a redundancy exists in the time direction. In this case, since it is equivalently decided that a plurality of frames can be collectively represented by one average image, an average image with which a greatest number of frames can be collected from among average images wherein the sum total is equal to or lower than the threshold value is replaced into the frames to compress the image. In the example of FIG. 6, a case in which averaging is carried out for every two frames to generate two average images and another case in which averaging is carried out for every four frames to generate one average image are set.

However, since compression to such a degree that one storage unit hereinafter described is not satisfied is not required, in the example of FIG. 6, a case in which an image for four frames is represented by one average image is set only for an image having 8×8 pixels. Further, the compression in the time direction is not carried out for an image having 4×4 pixels. As a result of the decision at S32*b*, as depicted in FIG. 6, cases occur in which eight kinds of data structures of 8×8 pixels×4 frames, 8×8 pixels×2 frames, 8×8 pixels×1 frame, 8×4 pixels×4 frames, 8×4 pixels×2 frames, 4×8 pixels×4 frames, 4×8 pixels×2 frames and 4×4 pixels×4 frames appear including also a case in which the compression in the time direction is not carried out.

Similarly to the decision with regard to a redundancy in the space direction, the decision may be carried out such that the sum total of the differences between pixel values is compared with a threshold value for every one frame of the original image and compression is permitted under the condition that the sum total is equal to or lower than the threshold value with regard to all four frames. Alternatively, the threshold value decision may be carried out for the sum total of the differences between pixel values for four frames. It is to be noted that the choices for the reduction magnification and the reduction number of frames are not limited to those depicted in FIG. 6, but may be suitably determined, for example, in response to the size of the original data block, the data size of a storage unit or the like. Also the order of the redundancy decision in the space direction and the redundancy decision in the time direction may be reversed from that depicted in FIG. 6. Alternatively, both decisions may be carried out at the same time by carrying out reduction and decrease of the number of frames at a time in various combinations. Alternatively, only one of the decisions may be carried out.

Figure 7:
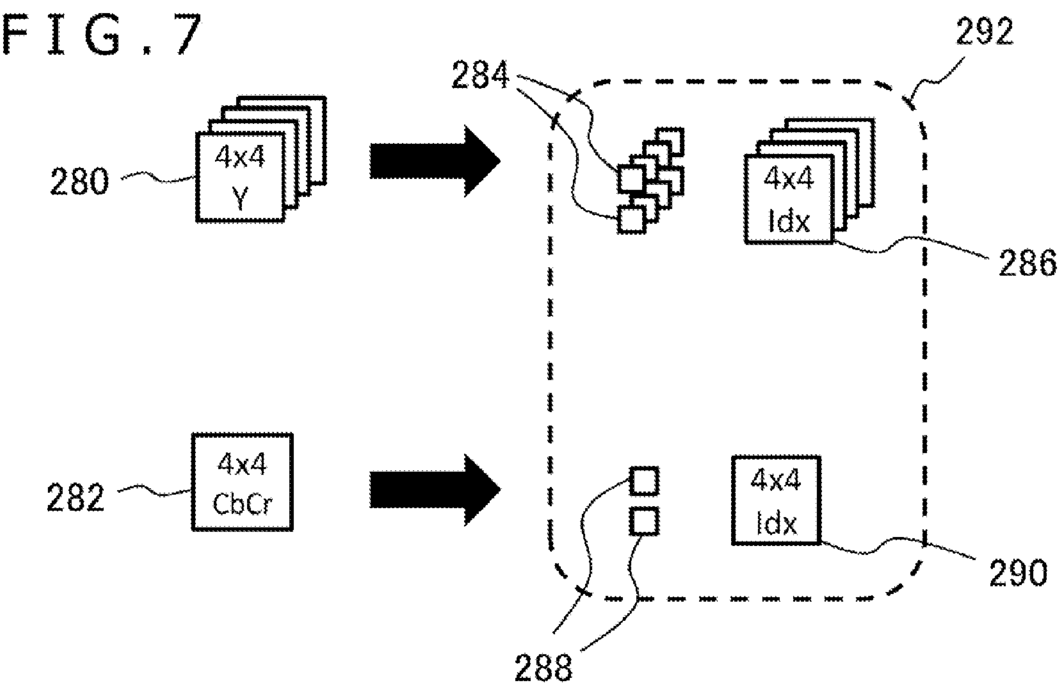
FIG. 7 is a view schematically illustrating a manner in which a data block after a compression decision is carried out is further divided to form quantization units to quantize pixel values in the present embodiment.

FIG. 7 schematically illustrates a manner in which the data block after such compression decision as described above is carried out is further divided to form quantization units to quantize pixel values at step S34 of FIG. 5. Each quantization unit is a set of a predetermined number of pixels obtained by dividing the data block in a space direction, in a time direction or in both of the space and time directions. A pair of pallets representative of two representative values and an index which associates identification information indicative of one of the pallets and an intermediate value between the pallets with pixels are generated for each quantization unit. The pallets and the index are basically similar to those generated from an RGB image in the S3TC texture compression method. On the other hand, in the present embodiment, the dimension number of parameters is different from that of general S3TC.

It is to be noted that, before quantization described hereinabove is carried out, a YCbCr image is divided into a Y image and a CbCr image, and then the CbCr image is reduced. In an example in the following description, it is assumed that the CbCr image is reduced to ½ in both of the vertical and horizontal directions. At the left side in FIG. 7, one rectangle represents a quantization unit 280 of the Y image or a quantization unit 282 of the CbCr image. In the following description, it is assumed that the quantization unit includes 16 pixels. Accordingly, while a quantization unit is symbolically represented as an image of 4×4 pixels in FIG. 7, depending upon a division pattern, some pixels of a different frame may be mixed in the quantization unit.

By the quantization, pallets 284 and an index 286 are generated from the quantization unit 280 of the Y image while pallets 288 and an index 290 are generated from the quantization unit 282 of the CbCr image. Since the CbCr image has a ¼ size with respect to the Y image, four quantization units of the Y image correspond to one quantization unit of the CbCr image. Accordingly, as depicted in FIG. 7, the pallets and the indexes generated from the corresponding quantization units are collected to generate one storage unit 292. Upon display, data of one storage unit can be used to restore pixel values in the corresponding region.

Figure 8:
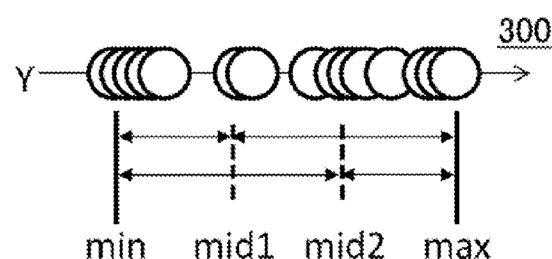
FIG. 8 is a view illustrating a method for generating data of a pallet and an index from quantization units of a Y image in the present embodiment.

FIG. 8 is a view illustrating a method of generating data of pallets and an index from a quantization unit of a Y image. As described hereinabove, one quantization unit includes 16 pixels. In FIG. 8, each of pixels is schematically represented by a circle. Where a value of the luminance Y held as a pixel value by each pixel is represented on an axis for the luminance Y, such a distribution 300 as depicted in FIG. 8 is obtained. Two representative values are selected from among the 16 pixel values plotted on the distribution 300. For example, a minimum value (min) and a maximum value (max) are selected as the representative values and data which holds the two selected values is determined as a pallet.

Further, where the value of the luminance Y which internally divides a line segment between the minimum value and the maximum value on the axis of the luminance Y into 1:2 is determined as a first intermediate value (mid1) and the value of the luminance Y which internally divides the line segment into 2:1 is determined as a second intermediate value (mid2), data which holds, for each of the pixels, information which designates one of the four values of the minimum value, first intermediate value, second intermediate value and maximum value is determined as an index. As a result, with regard to a quantization unit of the Y image, the pallet is data of 8 bits representing the luminance Y×2 values=2 bytes and the index is data of 2 bits of information representing identification numbers of the four values as 0 to 3×16 pixels=4 bytes.

Figure 9:
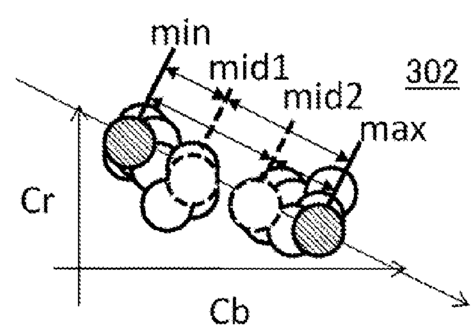
FIG. 9 is a view illustrating a method for generating data of a pallet and an index from quantization units of a CbCr image in the present embodiment.

FIG. 9 is a view illustrating a method of generating data of a pallet and an index from a quantization unit of a CbCr image. Similarly as in the quantization of the Y image, one quantization unit includes 16 pixels. However, the value held by each pixel is a two-dimensional vector value having (Cb, Cr) as elements. Where the pixel values are represented on a two-dimensional plane having axes of the color differences Cb and Cr, such a distribution 302 as depicted in FIG. 9 is obtained.

Two representative values are selected from among the 16 pixel values plotted on the distribution 302. For example, where the distribution 302 is approximated by a straight line, color differences at the left end and the right end of the straight line are determined as a minimum value (min) and a maximum value (max), respectively, and determined as representative values. Data which holds the two calculated values is determined as a pallet. At this time, each of the representative values is a vector value having (Cb, Cr) as elements.

Further, where the color difference which internally divides a line segment between the minimum value and the maximum value on the approximate straight line into 1:2 is determined as a first intermediate value (mid1) and the color difference which internally divides the line segment into 2:1 is determined as a second intermediate value (mid2), data which holds, for each of the pixels, information which designates one of the four values of the minimum value, first intermediate value, second intermediate value and maximum value is determined as an index. As a result, with regard to a quantization unit of the CbCr image, the pallet is data of 2 elements of the color differences Cb and Cr×8 bits representing the color difference×2 values=4 bytes while the index is data of 2 bits of the information representing the identification number of the four values as 0 to 3×16 pixels=4 bytes.

If data are compressed in such a manner as described above, then since the storage unit 292 depicted in FIG. 7 includes 2 bytes of the pallet of the Y image×4 quantization units=8 bytes, 4 bytes of the index of the Y image×4 quantization units=16 bytes, 4 bytes of the pallet of the CbCr image and 4 bytes of the index of the CbCr image, the storage unit 292 is data of totaling 32 bytes. Since one storage unit 292 holds data for 16 pixels×4 quantization units=64 pixels, one pixel in the data after the quantization corresponds to 0.5 bytes.

As described above, in the present embodiment, after an original RGB image is decomposed into a Y image which holds a one-dimensional parameter and a CbCr image which holds a two-dimensional parameter, a pallet and an index are generated. Therefore, in the case of a one-dimensional Y image, all sample values are distributed on a straight line, and, also in a two-dimensional CbCr image, a sample displaced from an approximate straight line exists only in a normal direction to the pertaining approximate straight line. Accordingly, in comparison with a general S3TC method in which an RGB image which holds a three-dimensional parameter is approximated by a straight line and then is quantized, the quantization error can be suppressed small.

Figure 10:
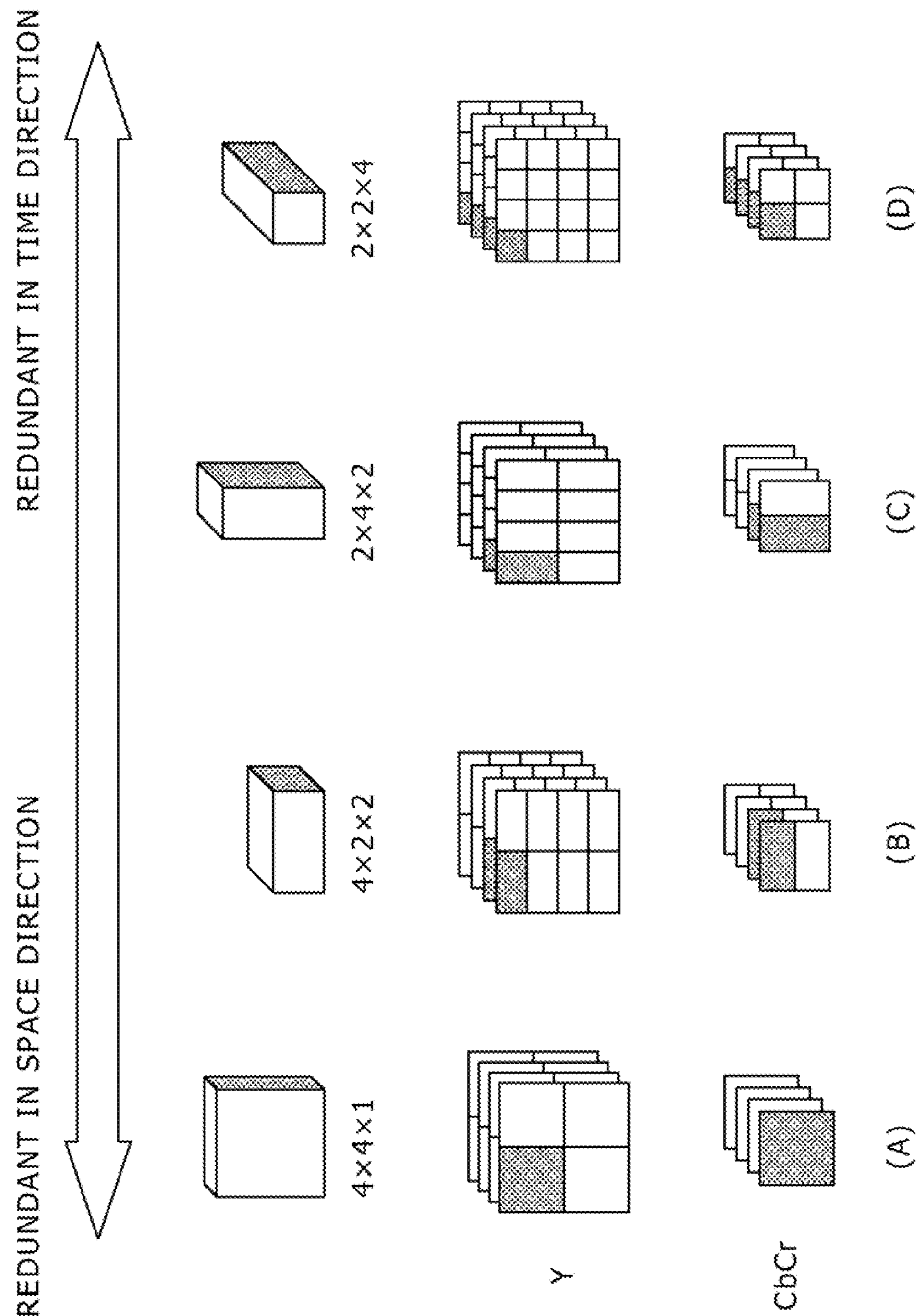
FIG. 10 is a view illustrating variations of a division pattern to be stored into a division pattern storage section in order to form a quantization unit configured from 16 pixels in the present embodiment.

FIG. 10 illustrates variations of a division pattern to be stored into the division pattern storage section 132 in order to form a quantization unit configured from 16 pixels. The variations in FIG. 10 are referred to, from the left side, as pattern (A), pattern (B), pattern (C) and pattern (D), and for Y images on the upper stage and CbCr images on the lower stage, a delimiter in space division is represented by a straight line and one quantization unit is expressed representatively by shading. It is to be noted that, in FIG. 10, a manner in which, regarding both of the Y images and the CbCr images, data blocks which are not subject to compression by the redundancy, namely, the Y frames of 8×8 pixels×4 frames and the CbCr images of 4×4 pixels×4 frames, are divided is illustrated.

In the pattern (A), the images are divided for every 4×4 pixels×1 frame. In the pattern (B), the images are divided for every 4×2 pixels×2 frames. In the pattern (C), the images are divided for every 2×4 pixels×2 frames. In the pattern (D), the images are divided for every 2×2 pixels×4 frames. More detailed time division is carried out toward the pattern (A) from the pattern (D), and more detailed space division is carried out toward the pattern (D) from the pattern (A). Such division patterns as described above are prepared, and one of the division patterns is selected in accordance with a characteristic of an image regarding whether the image has a redundancy in a space direction or has a redundancy in a time direction.

In particular, where an in image has a space redundancy as in a case in which a region having colors proximate to one color such as the sky or a turf is included much, the pixel values in the region are likely to become more uniform with respect to the space. Therefore, even if the space division number is reduced, an error by quantization is less likely to be included, and therefore, a division pattern near to the pattern (A) is selected. On the other hand, where an image has a time redundancy as in a case in which a landscape including less motion is observed by fixed-point observation or in a like case, the pixel values are likely to become uniform in a time direction. Therefore, even if the time division number is reduced, since an error by quantization is less likely to be included, a division pattern near to the pattern (D) is selected.

Figure 11:
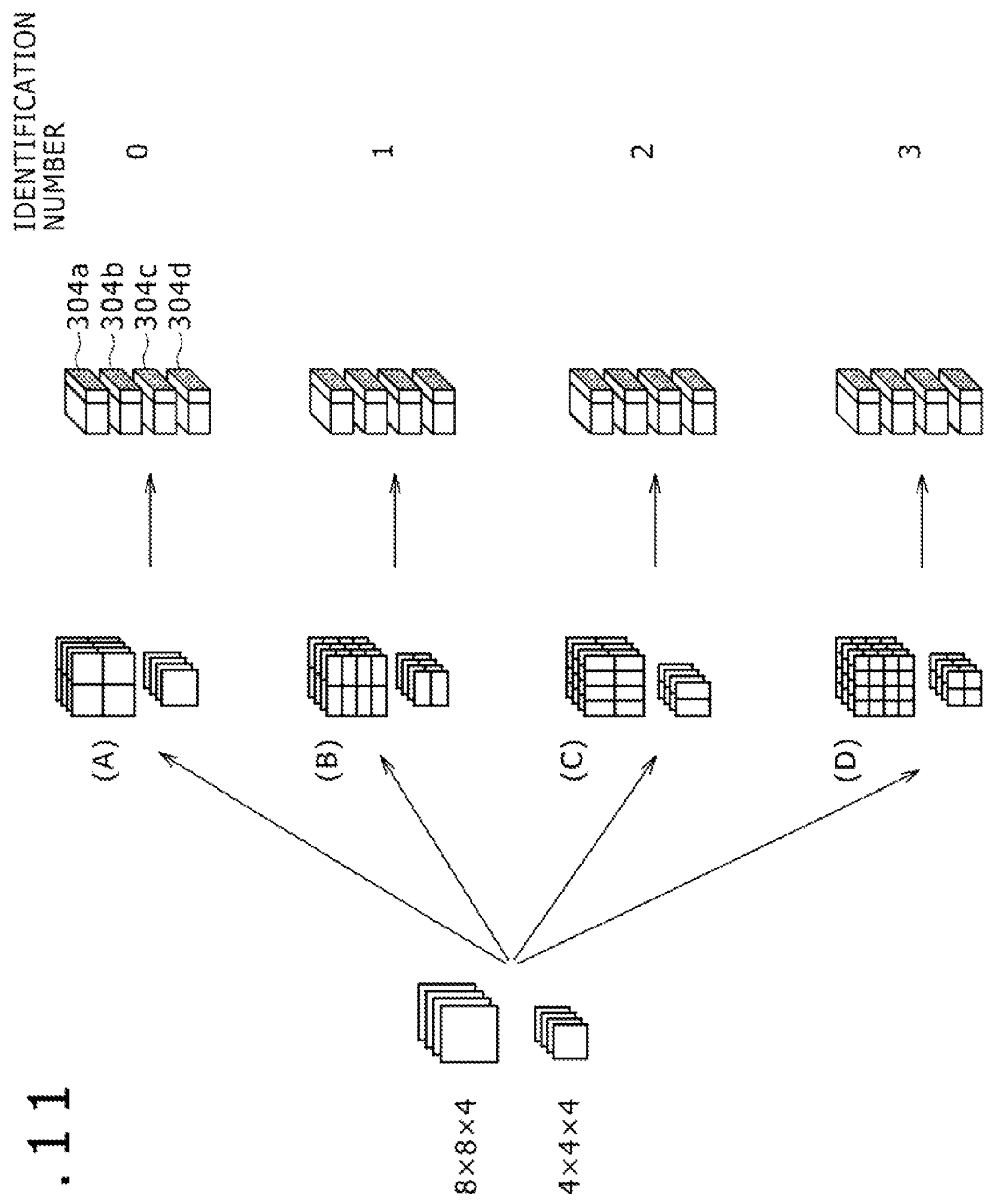
FIG. 11 is a view illustrating division patterns when a quantization unit is generated from a data block in a case compression by a redundancy is not carried out in the present embodiment.

Since the data structure of a data block before division actually is one of the eight types illustrated in FIG. 6, the division pattern which can be taken differs depending upon the data structure. FIG. 11 illustrates division patterns when a quantization unit is generated from a data block of 8×8 pixels×4 frames when compression by a redundancy is not carried out.

In this case, since a Y image of 8×8 pixels×4 frames and a CbCr image of 4×4 pixels×4 frames are generated, it is possible to select a division pattern from among all of the division patterns (A), (B), (C) and (D) as depicted in FIG. 10. In all of the division patterns, four storage units are generated per one data block (for example, storage units 304*a*, 304*b*, 304*c* and 304*d*). To the division patterns in this case, identification numbers "0," "1," "2" and "3" are applied individually.

Figure 12:
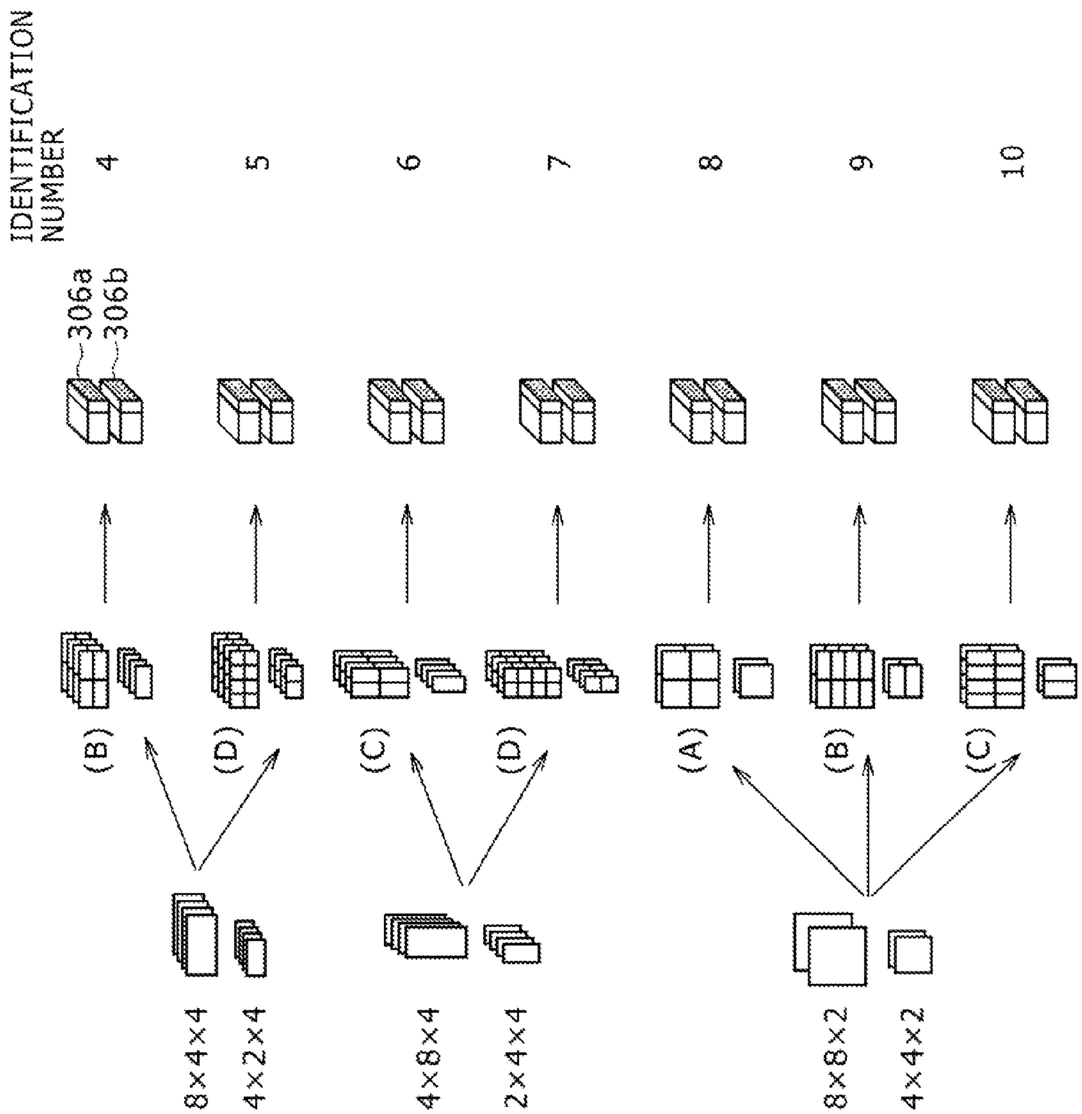
FIG. 12 is a view illustrating division patterns when a quantization unit is generated from a data block for which compression is carried out utilizing a redundancy in the present embodiment.

FIG. 12 illustrates division patterns upon generating quantization units when a data block is that of 8×4 pixels×4 frames, when a data block is that of 4×8 pixels×4 frames and when a data block is that of 8×8 pixels×2 frames as a result when compression using a redundancy is carried out. First, in the case where the data block is that of 8×4 pixels×4 frames, since a Y image of 8×4 pixels×4 frames and a CbCr image of 4×2 pixels×4 frames are generated, one of the division patterns (B) and (D) is selected. In the case where the data block is that of 4×8 pixels×4 frames, a Y image of 4×8 pixels×4 frames and a CbCr image of 2×4 pixels×4 frames are generated. Therefore, one of the division patterns (C) and (D) is selected.

In the case where the data block is that of 8×8 pixels×2 frames, a Y image of 8×8 pixels×2 frames and a CbCr image of 4×4 pixels×2 frames are generated. Therefore, one of the division patterns (A), (B) and (C) is selected. In all of the division patterns of FIG. 12, two storage units are formed per one data block (for example, storage units 306*a* and 306*b*). To the division patterns in this case, identification numbers "4," "5," "6," "7," "8," "9" and "10" are applied, respectively.

Figure 13:
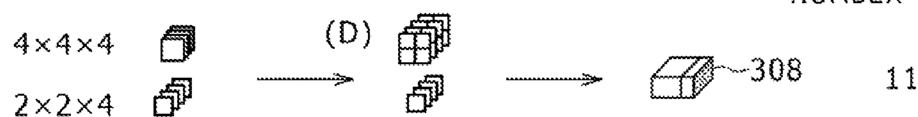
FIG. 13 is a view illustrating division patterns when a quantization unit is generated from a data block for which compression is carried out utilizing a redundancy in the present embodiment.
Figure 13:
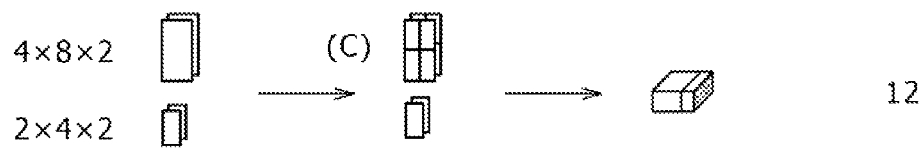
Figure 13:
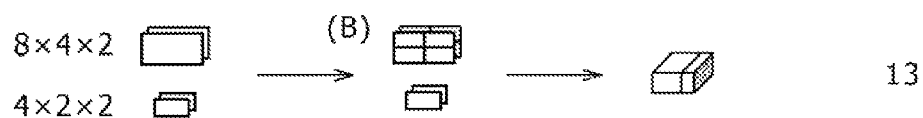
Figure 13:
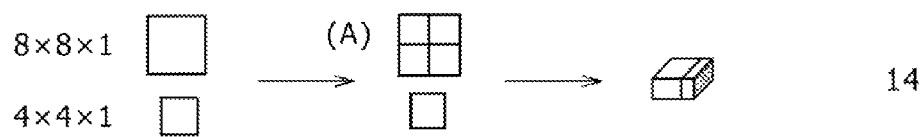

FIG. 13 illustrates division patterns upon generating quantization units when a data block is that of 4×4 pixels×4 frames, when a data block is that of 4×8 pixels×2 frames, when a data block is that of 8×4 pixels×2 frames and when a data block is that of 8×8 pixels×1 frame as a result when compression using a redundancy is carried out. First, in the case where the data block is that of 4×4 pixels×4 frames, a Y image of 4×4 pixels×4 frames and a CbCr image of 2×2 pixels×4 frames are generated. Therefore, the choice is limited to the pattern (D). In the case where the data block is that of 4×8 pixels×2 frames, a Y image of 4×8 pixels×2 frames and a CbCr image of 2×4 pixels×2 frames are generated. Therefore, the choice is limited to the pattern (C).

In the case where the data block is that of 8×4 pixels×2 frames, a Y image of 8×4 pixels×2 frames and a CbCr image of 4×2 pixels×2 frames are generated. Therefore, the choice is limited to the pattern (B). In the case where the data block is that of 8×8 pixels×1 frame, a Y image of 8×8 pixels×1 frame and a CbCr image of 4×4 pixels×1 frame are generated. Therefore, the choice is limited to the pattern (A). In all of the division patterns, one storage unit is generated per one data block (for example, a storage unit 308). To the division patterns in this case, identification numbers "11," "12," "13" and "14" are applied, respectively.

If identification numbers are applied in such a manner as described above, then each of the identification numbers comes to include a compression pattern utilizing a redundancy and a division pattern for forming quantization units as information. Into the division pattern storage section 132, the four kinds of division patterns (A) to (D) and the information for identifying them are stored in an associated relationship with each other in advance. The reference image compression section 122 determines an identification number corresponding to each data block based on a combination of a compression pattern and a selected division pattern. The identification number is included into compression data and is referred to in order to specify data of pixel values in a display region upon image display.

Where a plurality of choices are available for a division pattern of quantization units, all of the division patterns are carried out to perform quantization for each data block and then decoded. Then, that one of the division patterns whose decoding result indicates the least error from the original image is selected. Alternatively, a division pattern may be set in advance for each region using a test image having similar contents.

Now, a data structure of compression data of a reference image generated by the reference image compression section 122 is described. Compression data generated in the present embodiment is configured from a pallet and an index similarly as in the texture compression method of S3TC. Therefore, the decoding process can be carried out using a shading function of common GPUs as it is.

To this end, it is preferable to make it possible to read out and decode an index and a pallet generated by quantization of data of a Y image and an index and a pallet generated by quantization of data of a CbCr image similarly to an ordinary texture image. Therefore, when compression data are stored, quantization data of a Y image and quantization data of a CbCr image which represent the same region are collected into a single storage unit as described above so that the pixels can be restored by a small number of data accesses.

Figure 14:
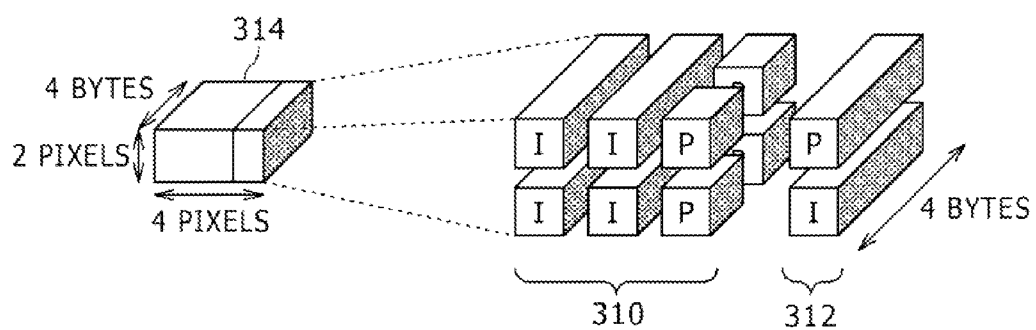
FIG. 14 is a view schematically illustrating a data structure of compression data of a reference image in the present embodiment.

FIG. 14 schematically illustrates a data structure of compression data of a reference image. The left side in FIG. 14 represents one storage unit 314, in which compression data 310 of a Y image and compression data 312 of a CbCr image which represent the same region are stored as depicted on the right side in FIG. 14. Each of rectangular solids denoted by "I" from within the compression data 310 of the Y image represents an index of one quantization unit, and each of rectangular solids denoted by "P" represents a pallet of one quantization unit. This similarly applies also to the compression data 312 of the CbCr image. As described hereinabove, the index and the pallet of the Y image are data of four bytes and two bytes per one quantization unit, respectively. Both of the index and the pallet of the CbCr image are data of four bytes per one coding unit.

Thus, as depicted in FIG. 14, the data of four quantization units of the Y image and one quantization unit of the CbCr image which represent the same region are collectively arrayed into a storage region of a depth of four bytes. Here, since the pallets from within the compression data 310 of the Y image are data of two bytes, two pallets are disposed in the depthwise direction as depicted in FIG. 14. As a result, one storage unit 314 includes data of 4×2×4 bytes.

If the compression data are collected in this manner, then one storage unit 314 can be stored as it is into a storage region for storing data of an RGBA image for 4×2 pixels. Since four storage units at the maximum are formed from a data block of 8×8 pixels×4 frames, the data size of one data block becomes equal to the data size of an RGBA image of 4×2 pixels×4=32 pixels at the maximum. If a redundancy is utilized for compression, then the data amount further decreases to ½ or ¼.

Here, a method of including an identification number representative of a compression pattern and a division pattern into compression data described hereinabove is described. An identification number is information of four bits because it is one of the 15 kinds of "0" to "14" as described hereinabove. Meanwhile, four pallets of a Y image are stored in one storage unit as illustrated in FIG. 14. In each pallet, two values which are representative values of a luminance Y are stored. Thus, identification information of four bits is represented by a storage order of and a relationship in magnitude between the two values held by each of the four pallets.

Figure 15:
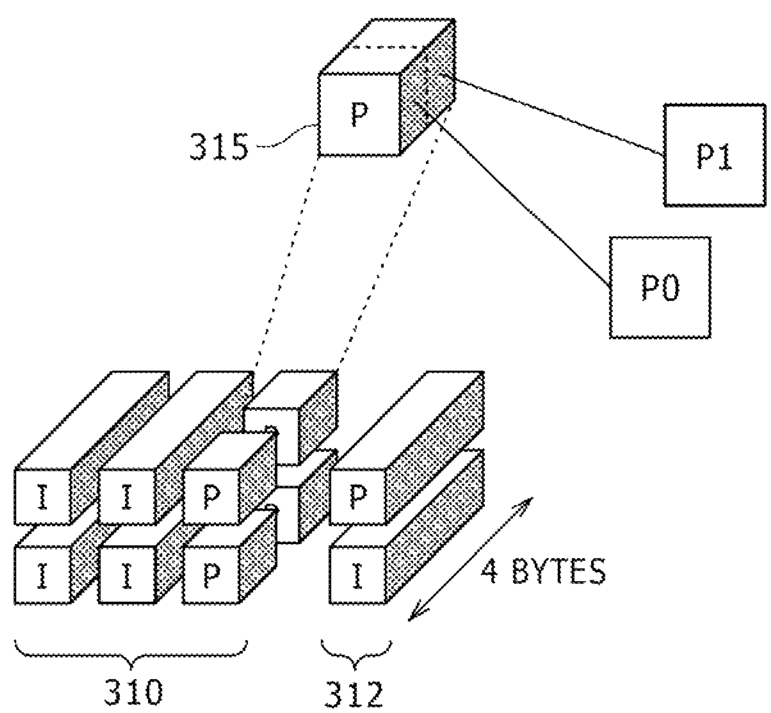
FIG. 15 is a view illustrating a method for representing an identification number representative of a compression pattern and a division pattern in the form of a pallet in the present embodiment.

FIG. 15 is a view illustrating a method of representing an identification number by a pallet. If a pallet 315 which is one of four pallets of a Y image as depicted in FIG. 14 is taken as an example, then two representative values "P0" and "P1"

are stored in order from the top address on this side of FIG. 15. At this time, information of one bit is represented by a relationship in magnitude of the values "P0" and "P1." It is set in advance that, for example, if P0>P1, then this represents 1 while any other relationship in magnitude of "P0" and "P1" represents 0.

Since one storage unit includes four pallets of a Y image, information of four bits can be represented if all of the four pallets are utilized and orders of the pallets corresponding to bit sequences are determined in advance. Which one of the two values held by a pallet is a minimum value or a maximum value is apparent depending upon the relationship in magnitude in value irrespective of which one of the values is stored in the preceding address, and therefore, the order does not have an influence on the decoding process. Therefore, if one identification number is determined from a compression pattern and a division pattern of each data block, then the reference image compression section 122 determines in response to the identification number into which one of the addresses a higher value of each pallet is to be stored.

It is to be noted that, when one data block forms a plurality of storage units, the same identification information is represented by all of the storage units. This makes it unnecessary to generate information of a compression pattern and/or a division pattern separately from the body of the compression data, and the data size can be suppressed as a whole. Further, since the information of a compression pattern and a division pattern are embedded for each compression data of a corresponding region, the efficiency upon referring to the information is high.

Figure 16:
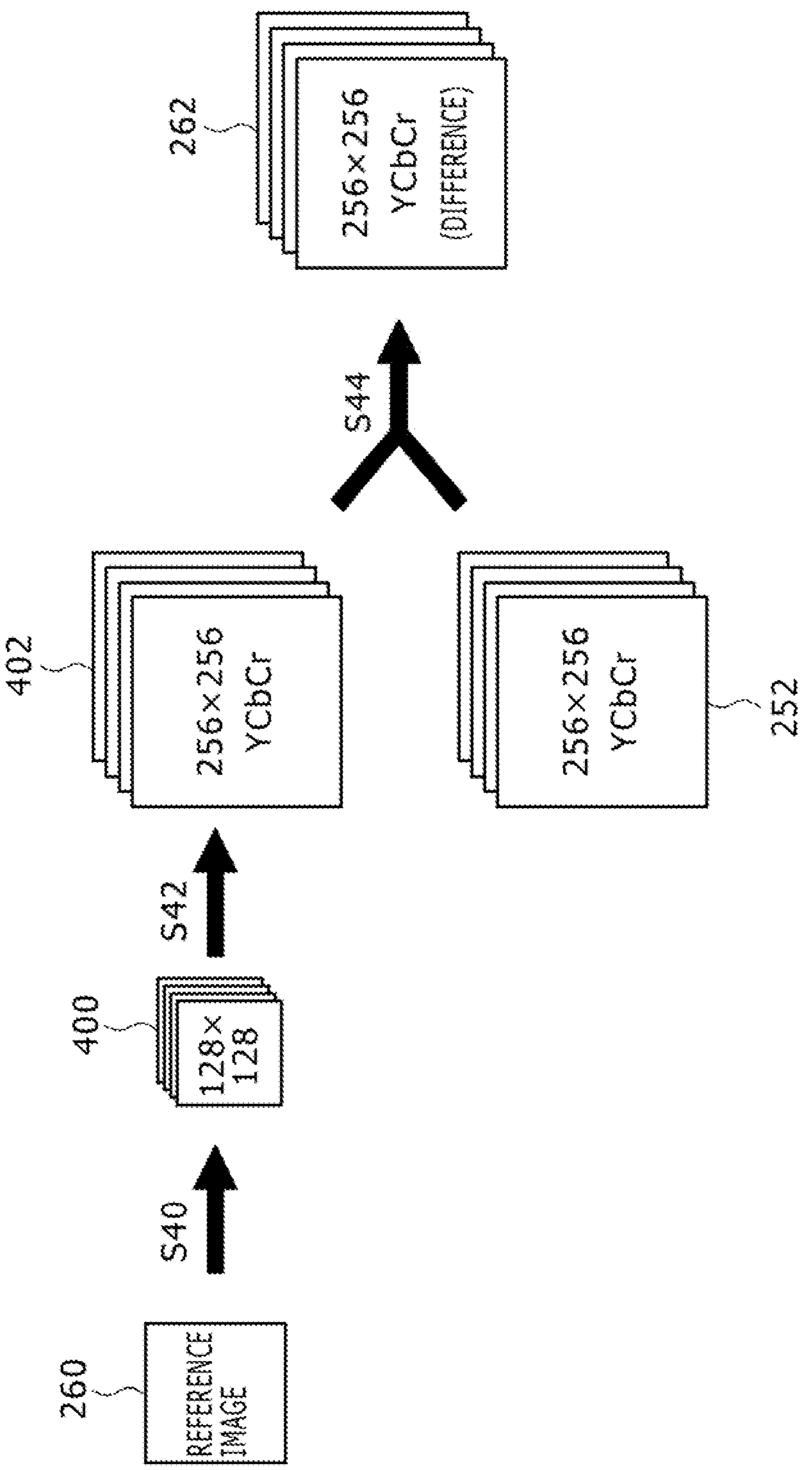
FIG. 16 is a view schematically illustrating a procedure for generating a difference image carried out by a difference image generation section in the present embodiment.

Now, a compression data generation process of a difference image is described with reference to FIGS. 16 to 19. FIG. 16 schematically illustrates a procedure for generating a difference image by the difference image generation section 124 at step S16 of FIG. 4. In FIG. 16, data same as those in FIG. 4 are denoted by same reference symbols. First, a YCbCr image sequence 252 of 256×256 pixels generated by the tile image sequence generation section 120 and compression data 260 of a reference image generated by the reference image compression section 122 using the YCbCr image sequence 252 are used as input data.

The difference image generation section 124 first decodes the compression data 260 of the reference image (S40). In particular, the difference image generation section 124 reads out all data of storage units which configure data blocks included in the same tile image sequence and restores a Y image and a CbCr image from the pallet and the index. At this time, an array of pixels can be specified by acquiring the identification numbers represented by the pallets of the Y image.

In particular, since the compression pattern utilizing a redundancy and the division pattern when the quantization unit is formed are identified from the identification number for each data block, the pixels included in the quantization unit are connected by a process reverse to the division process based on the compression pattern and the division pattern. Then, the CbCr image is enlarged to twice in the vertical and horizontal directions and then synthesized with the Y image to generate a YCbCr image. Next, the frame number is increased or the image is expanded by a process reverse to the compression process illustrated in FIG. 6. The data blocks restored in such a manner as described above are further connected to generate a YCbCr image sequence 400 of 128×128 pixels×4 frames.

Then, the YCbCr image sequence 400 of 128×128 pixels×4 frames is expanded to twice in the vertical and horizontal directions to generate a YcbCr tile image sequence 402 of 256×256 pixels×4 frames (S42). Then, a difference of the pixel values of the YCbCr tile image sequence 402 from those of the YCbCr image sequence 252 of the original tile images generated by the tile image sequence generation section 120 is calculated to generate a difference image sequence 262 (S44).

The processes at steps S40 and S42 are basically reverse processes to those of the procedure of the compression process of a reference image illustrated in FIGS. 4 and 5. However, since this compression process is an irreversible process in which image reduction, frame number reduction by averaging and quantization are carried out, there is the possibility that the restored tile image sequence 402 may include an error. This error is represented as a difference image to satisfy both of requirements for the compression rate and the picture quality.

The difference image is an image for supplementing errors caused by compression when compression data of a reference image are decoded and decompressed upon image display. Accordingly, it is necessary to make the processes of decoding and decompressing the compression data 260 of a reference image by the difference image generation section 124 at steps S40 and S42 same as those upon image display. On the other hand, in the present embodiment, the compression data 260 is collected in quantization units to make data access in a quantization unit possible and hence implements random access in a space direction and a time direction without carrying out useless data loading or decoding.

Accordingly, upon image display, it is not preferable that it becomes necessary to refer to a different quantization unit in order to decode or decompress a certain quantization unit. Therefore, when a new pixel is generated between pixels in the process of expanding a CbCr image to twice in the vertical and horizontal directions after data of quantization units are connected at step S40, the process of expanding an image in accordance with a compression pattern to change the size of the data blocks to the original size and the process of expanding the YCbCr image sequence 400 formed by connection of the data blocks to twice in the vertical and horizontal directions at step S42, the expansion process is completed within the pertaining quantization unit independently of the division pattern of the quantization unit.

Figure 17:
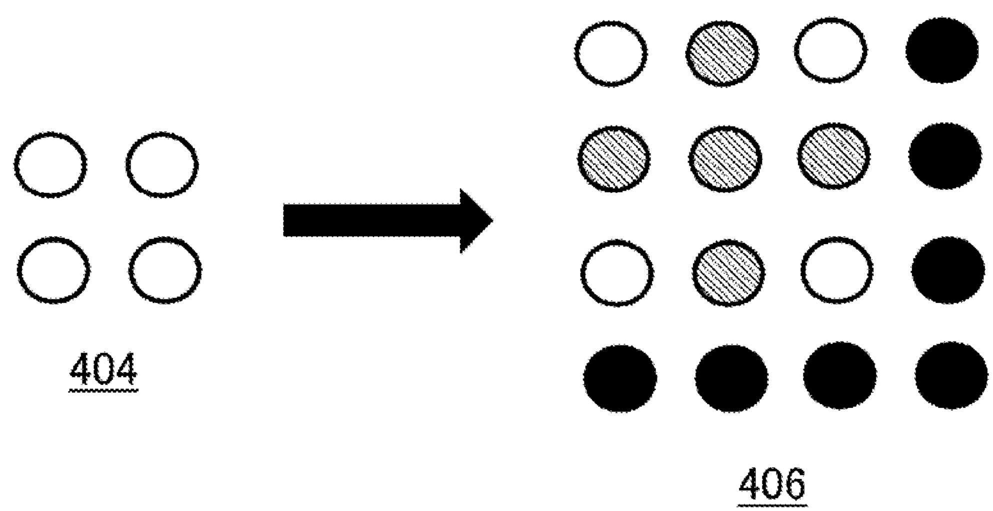
FIG. 17 is a view schematically illustrating an enlargement process of an image when a reference image is decoded in the present embodiment.

In particular, an image of an expansion target is divided into 2×2 pixels, and pixel values of pixels between the pixels are calculated by interpolation while pixel values outside the 2×2 pixels are calculated by extrapolation. FIG. 17 schematically illustrates a process of expanding an image in this manner. At the left side in FIG. 17, each pixel in a region 404 in which an image before expansion is divided into 2×2 pixels is indicated by a blank circle. When the pixels are used to generate an expansion region 406 configured from 4×4 pixels, pixel values of pixels (shaded circles) between the blank circles originally having pixel values are obtained by interpolating the pixel values of the pixels of the blank circles.

Pixel values of pixels (dark circles) on the outer side of the blank circles originally having pixel values are obtained by extrapolation using the pixels of the blank circles and the interpolation values thereof. Since a quantization unit includes a region of 2×2 pixels irrespective of which division pattern the quantization unit has, if the expansion process is carried out in this manner, then the expansion process is completed within the quantization unit irrespective of the division pattern. Accordingly, also when the difference image generation section 124 expands a CbCr image or expands a YCbCr image as described above, the expansion process is carried out in this manner. It is to be noted that, for the extrapolation values, a lower limit value and an upper limit value are set depending upon gradations of pixel values so that the pixel values are adjusted so as not to exceed the gradation range. Since details of the decoding process of a reference image are similar to those of a decoding process in an apparatus which carries out image display, they are hereinafter described.

The difference image compression section 126 compresses a difference image generated in such a manner as described above (S18 in FIG. 4). This process is basically similar to the compression process of a reference image illustrated in FIG. 5. In the following, description is given paying attention to differences from a reference image. First, a difference image sequence 262 is divided into a size same as the size of the reference image in the space direction to form data blocks of processing units similarly as at step S30 of FIG. 5. Here, one data block is configured from 8×8 pixels×4 frames as illustrated in FIG. 6. However, different from the reference image, the difference image remains an image of 256×256 pixels, and therefore, the difference image is divided into 32 portions in both of the vertical and horizontal directions.

Further, as regards the difference image, a decision of whether or not pixel values are regarded as 0 is carried out for every data block, and a data block whose pixel values are regarded as 0 is determined as NULL block. For example, for all pixel values which configure a data block, comparison between an absolute value of the pixel value and a threshold value determined in advance is carried out. If the absolute values of all pixel values are equal to or lower than the threshold value, then the data block is determined as NULL block.

A data block determined as a NULL block is treated in decoding upon image display such that all pixel values are 0. For example, one storage unit in which all pixel values are 0 is generated in advance, and when final compression data is generated, all data blocks determined as NULL blocks and the storage unit are associated with each other. Where it is possible to process also NULL blocks similarly to other blocks, the decoding process upon image display is simplified and the processing efficiency is improved.

Since a difference image is an image which represents errors caused by compression of a reference image as described hereinabove, the possibility that the pixel values may be close to 0 is high. In a region in which the image frequency is low such as, for example, the blue sky or a turf, such an error as described above is less likely to occur. If such a nature of an image is found out by the process described above and pixel values of a difference image are treated as 0, then the processing efficiency upon image display can be improved and the data compression rate can be raised.

Then, the difference image compression section 126 confirms whether or not each data block has a redundancy in a space direction and a time direction similarly as at step S32 of FIG. 5, and compresses, when it is decided that the data block has a redundancy, the data in the direction or directions. This process may be similar to that for the reference image. The difference image compression section 126 then decomposes the YCbCr image into a Y image and a CbCr image similarly as at step S34 in FIG. 5. The difference image compression section 126 reduces the CbCr image and time-space divides the reduced CbCr image with one of the division patterns to form quantization units configured from an equal number of pixels and then quantizes the data.

The division process at this time may be similar to that for the reference image. On the other hand, since the difference image has a nature that the range of pixel values is more restrictive than the reference image as described hereinabove, this nature is utilized to make information to be held by the pallets different from each other. Specifically, in place of decreasing the gradations of the value to be held by a pallet, not two values but four values are held as representative values. In particular, while the pallet of a reference image is configured from 8 bits×2 values=2 bytes per one element, the pallet of a difference image represents 4 bits×4 values utilizing two bytes equally. The index holds information for designating one of the four values for each pixel. This eliminates the carrying out of linear interpolation for determining a first intermediate value and a second intermediate value in decoding upon image display, and the processing efficiency is improved. Further, the limitation of the choice for the first intermediate value and the second intermediate value to the interpolation values of 2:1 and 1:2 between a maximum value and a minimum value is eliminated. Therefore, more flexible selection of a first intermediate value and a second intermediate value becomes possible, and improvement in picture quality can be expected.

The four values to be held by a pallet are determined based on a minimum value, a maximum value, a first intermediate value and a second intermediate value of a Y image and a CbCr image illustrated in FIGS. 8 and 9. In particular, if the four values can be represented in a data size of four bits per one element, then the four values are stored as they are into the pallet. On the other hand, if gradations necessary for representing the four values are not sufficiently represented by four bits, all values are successively multiplied by ½, ¼ and ⅛ to determine a magnification which can be represented by four bits, and then the four values are multiplied by the determined magnification and stored into the pallet. It is to be noted that, since the pallet of a CbCr image is a vector value configured from two elements of (Cb, Cr), each of the four values is represented by eight bits.

Figure 18:
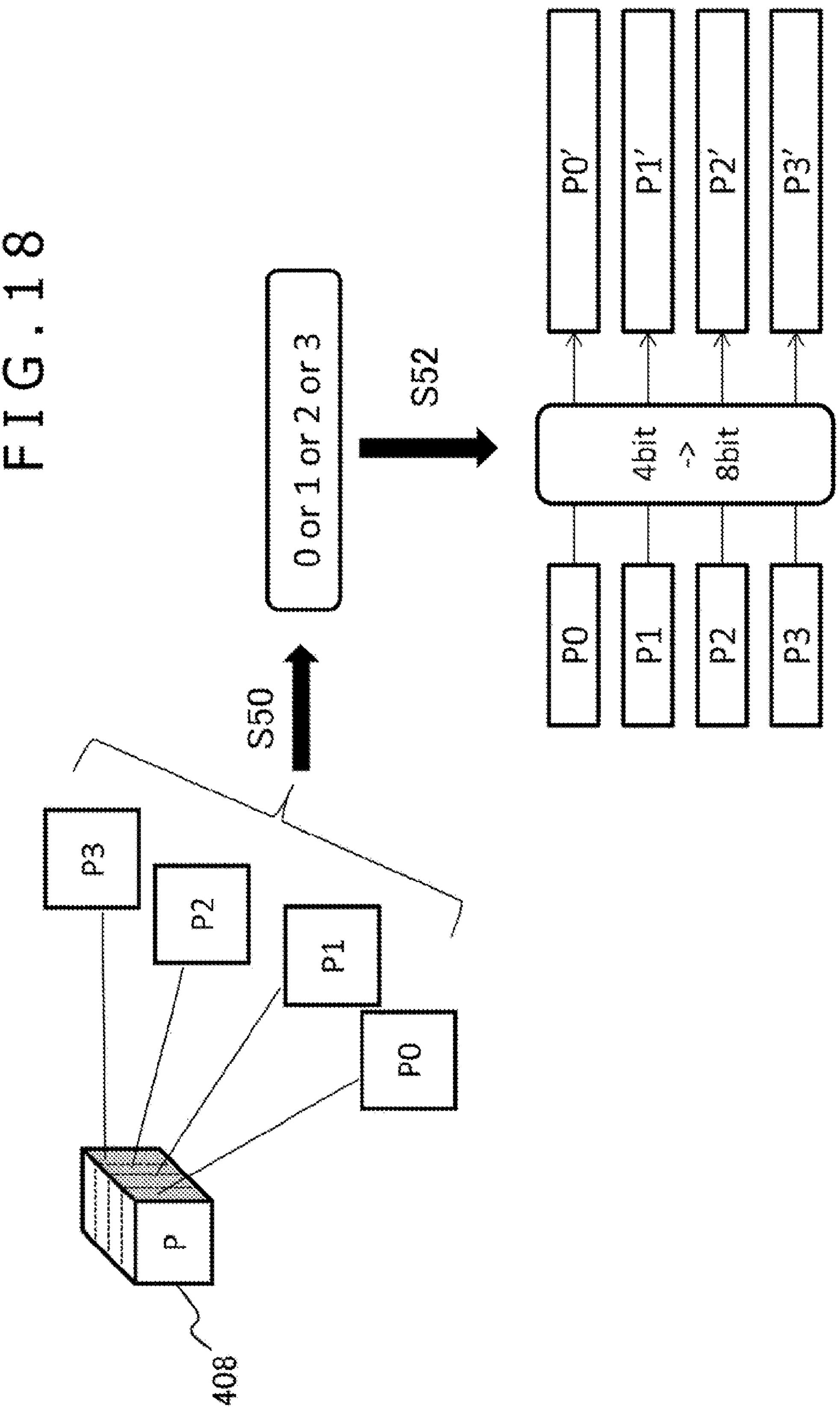
FIG. 18 is a view illustrating a method wherein an identification number of a magnification upon decoding of a value stored in a pallet is represented by the pallet in the present embodiment.

Upon image display, the values of four bits are converted into and used as values of eight bits. At this time, in order to restore the minimum value, maximum value, first intermediate value and second intermediate value from the values of the pallet, a magnification to be multiplied is needed to be indicated for each pallet. Where values obtained by multiplication by 1, ½, ¼ or ⅛ in such a manner as described above are to be stored into a pallet, four choices of one time, second times, four times and eight times are available as a magnification for restoration. Therefore, information of two bits representative of the identification numbers "0" to "3" for identification of the four choices is embedded into compression data. FIG. 18 is a view illustrating a method of representing an identification number of a magnification by a pallet.

In FIG. 18, four values "P0," "P1," "P2" and "P3" of four bits of a Y image, or four values "P0," "P1," "P2" and "P3" of totaling eight bits of two elements of a CbCr image, are stored into one pallet 408 in the order beginning with the top address on this side of FIG. 18. At this time, an identification number is represented by totaling two bits including one bit which depends upon a relationship in magnitude between the former two values "P0" and "P1" and a different one bit which depends upon a relationship in magnitude between the latter two values "P2" and "P3." Such rules are set in advance that, for example, if P0>P1, then this represents 1 whereas any other relationship between the values P0 and P1 represents 0, and that, if P2>P3, then this represents 1 whereas any other relationship between the values P2 and P3 represents 0.

It is to be noted that, in the case of a CbCr image, information of eight bits when values of four bits for Cb and values of four bits for Cr, which are elements of the vector value (Cb, Cr), are connected by a bit sequence is determined as "P0," "P1," "P2" and "P3." Accordingly, if a value of eight bits can be acquired from the pair of (Cb, Cr), then the values may not be stored in successive regions of eight bits. Since four values in regard to a CbCr image are represented by a vector value, if comparison is carried out for information of totaling eight bits, then even if one of the elements has an equal value, the values of eight bits do not become equal.

The identification numbers "0" to "3" can be represented by information of totaling two bits described above for each pallet. The four values held by a pallet do not have an influence on the decoding process because the minimum value, maximum value, first intermediate value and second intermediate value can be decided depending upon a relationship in magnitude between the values irrespective of the storage order. In decoding upon image display, the identification number is specified first (S50), and then when the four values P0, P1, P2 and P3 are converted from four bits into eight bits, they are multiplied by a magnification represented by the identification information to determine P0', P1', P2' and P3' to restore the minimum value, maximum value, first intermediate value and second intermediate value (S52).

Figure 19:
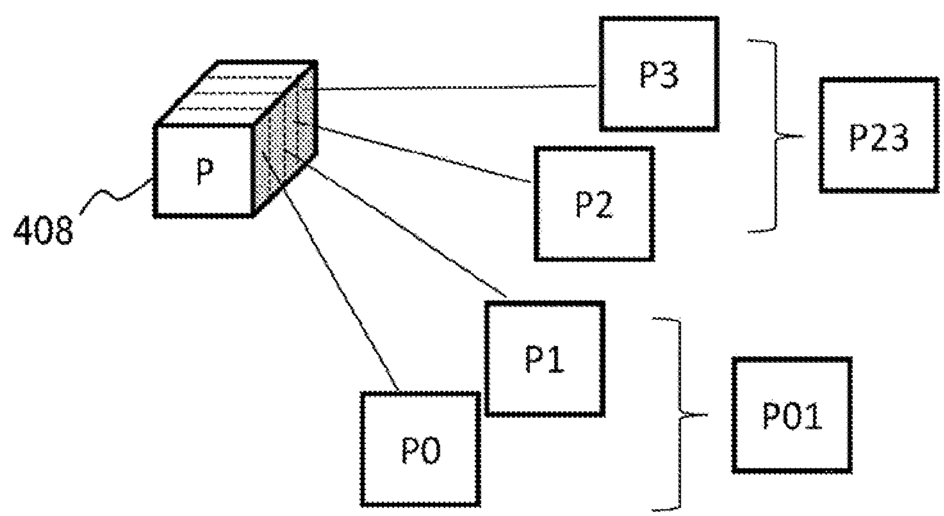
FIG. 19 is a view illustrating a method for representing an identification number representative of a compression pattern and a division pattern by a pallet of a Y image of a difference image in the present embodiment.

In this manner, in the pallets of a Y image of a difference image, four values of four bits are stored. In the pallets of a reference image, the 15 different identification numbers "0" to "14" each representative of a compression pattern and a division pattern are represented by a storage order of and a relationship in magnitude between two values of eight bits. FIG. 19 is a view illustrating a method of representing the 15 different identification numbers further by a pallet of a Y image of a difference image. As described hereinabove with reference to FIG. 18, into one pallet 408, the four values "P0," "P1," "P2" and "P3" are stored. Here, information of one bit is represented by a relationship in magnitude between the value of eight bits (represented as "P01" in FIG. 19) formed by connecting the bit sequences of "P0" and "P1" and the value of eight bits (represented as "P23" in FIG. 19) formed by connecting the bit sequences of "P1" and "P2."

Such a rule is set in advance that, for example, if P01>P23, then this represents 1 whereas any other relationship of the values P01 and P23 represents 0. As a result, this process is same as that in the case of a reference image in that the value of the eight bits of the upper address and the value of the eight bits of the lower address of the pallet are compared with each other to decide a relationship in magnitude between the values. Accordingly, similarly as in the case of the reference image, an identification number representative of a compression pattern and a division pattern can be represented by four pallets. The difference image compression section 126 determines a storage order of the four values to be stored into the pallet of the Y image so that the four values represent both of an identification number representative of a magnification for restoring the values of the pallets into the original values and an identification number representative of a compression pattern and a division pattern.

Figure 20:
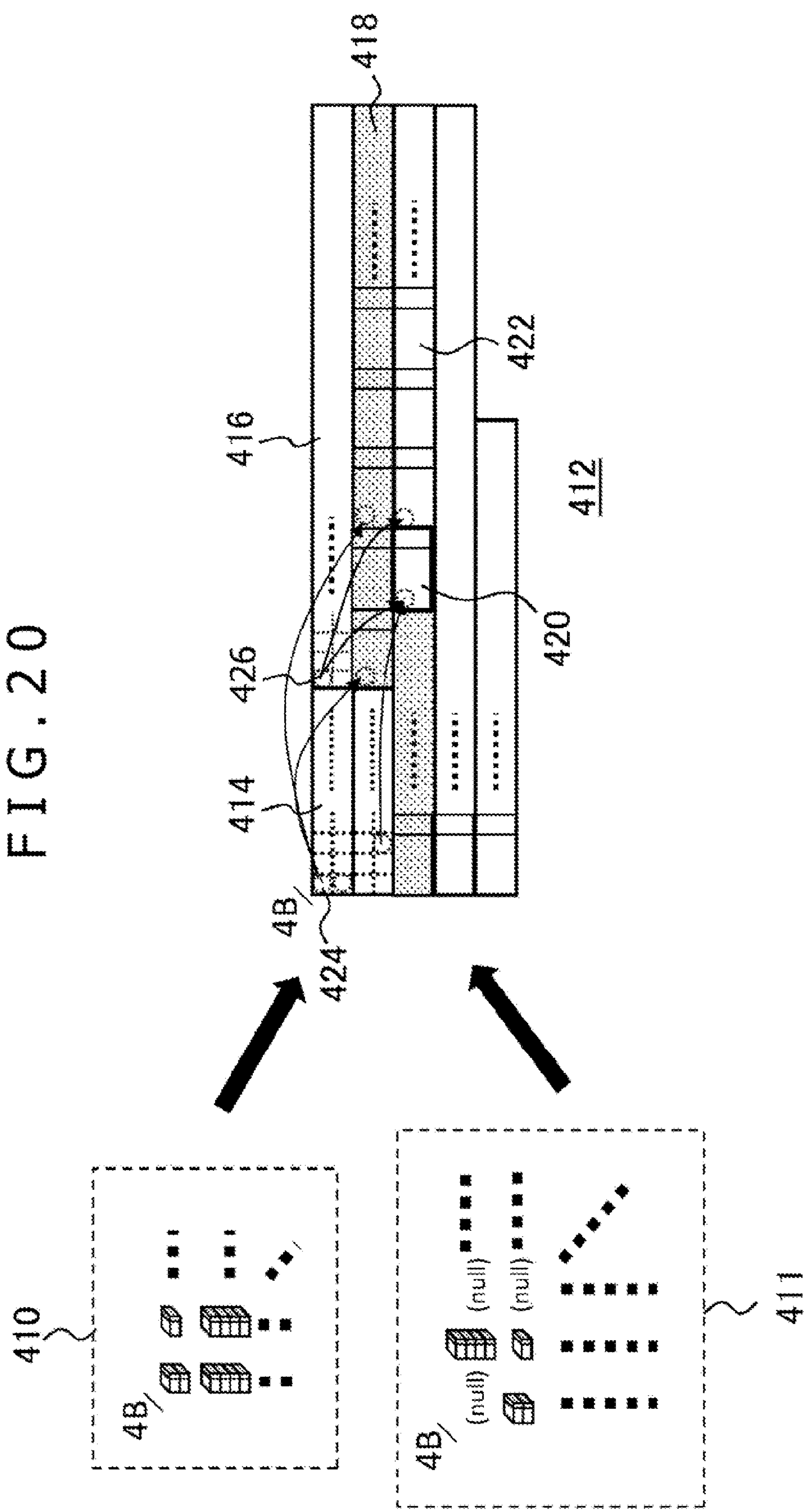
FIG. 20 is a view schematically illustrating a processing procedure of generating final compression data including compression data of a reference image and compression data of a difference image in the present embodiment.

Now, a process of generating final compression data by the compression data generation section 128 is described. FIG. 20 schematically illustrates a processing procedure for generating final compression data 268 including compression data 260 of a reference image and compression data 266 of a difference image at step S20 of FIG. 4. As described hereinabove, compression data of a reference image and compression data of a difference image are individually formed in units of data blocks.

In particular, in the case of the example described hereinabove, from four frames of a tile image sequence obtained by dividing a frame sequence of an original moving picture into 256×256 pixels, a data block array 410 of a reference image and a data block array 411 of a difference image are generated. The data block array 410 of the reference image is configured from compression data of 16×16 data blocks, and the data block array 411 of the difference image is configured from compression data of 32×32 data blocks. The size of the compression data of the data blocks is variable in length and corresponds to one of one, two or four storage units. It is to be noted that, in the difference image, a data block is treated as a NULL block depending upon the values thereof.

Each storage unit has a data size equal to that of data of an RGBA image of 4×2 pixels as described hereinabove. The compression data generation section 128 connects the compression data of the storage units of the data blocks in a predetermined order of the data block array in a predetermined direction for each storage unit. Then, the compression data generation section 128 adds pointer information for associating a position of the data blocks on the array and a storage place of the storage units with each other. In the example of compression data 412 in FIG. 20, pointer information 414 for the reference image data, pointer information 416 for the difference image data, compression data 418 of the reference images, compression data 420 for a NULL block of the difference image and compression data 422 of the difference images are juxtaposed in this order in a raster direction.

Also the pointer information 414 for the reference image data and the pointer information 416 for the difference image data are successively decompressed horizontally while two pieces of data each for four bytes are juxtaposed vertically similarly to the storage units. The storage order of the pointer information in this instance is made same as the order of the corresponding data blocks on the array so that the position of each data block on the array and the storage position of each storage unit are associated with each other by a pointer.

Where the compression data are successively generated in this manner, an image plane on which belt-like rows having a width of two pixels are connected to each other in the vertical direction is generated. Therefore, the compression data 412 are grasped as an image plane, and pointer information is represented by coordinates of the left upper corner of a region of a storage unit corresponding to each data block. For example, if the coordinates are represented by UV coordinates and the U coordinate and the V coordinate are individually represented by one byte, then a pointer for one storage unit becomes information of totaling two bytes. As a result, pointers of two data blocks can be represented by one pixel where the compression data 412 are an image plane.

Even if the original moving picture is a high-definition image of 8000×4000 pixels or the like, if the compression data 412 themselves are suppressed to 256×256 pixels or less, then the pointer information can be represented by a U coordinate and a V coordinate individually of one byte as described above. In this case, the pointer information 414 for the reference image data becomes a region for 128 pixels for representing 16×16 =256 data blocks, and the pointer information 416 for the difference image data becomes a region for 512 pixels for representing 32×32=1024 data blocks. It is to be noted that, if the pointer information is not represented satisfactorily by a U coordinate and a V coordinate individually of one byte, then it may be represented by a U coordinate and a V coordinate individually of a greater data length such that, for example, a U coordinate and a V coordinate are individually represented by two bytes. Alternatively, the size of tiles for division may be changed so that the pointer information can be represented sufficiently by one byte.

For example, each of two pieces of pointer information represented by a certain pixel 424 from within the region of the pointer information 414 for the reference image data indicates coordinates of the left upper corner of the region of a certain storage unit included in the compression data 418 of the reference images. The storage units are those at the top of the storage units configuring the data blocks corresponding to the pointers. Meanwhile, from within the pointer information 416 for the difference image data, one of two pieces of pointer information represented by a certain pixel 426 represents the compression data 420 for a NULL block while the other of the two pieces of the pointer information represents coordinates of the left upper corner of the region of a certain storage unit included in the compression data 422 for the difference images. Also the storage units are those at the top of the storage units which configure the data blocks corresponding to the pointers.

The compression data 420 for a NULL block is prepared one for every four frames of a tile image sequence as occasion demands so that it is associated with a plurality of data blocks. By generating such compression data for every predetermined number of frames (in the example described hereinabove, for every four frames) for all tile image sequences, the entire original moving picture can be compressed similarly. The compression data of the tile image sequences are stored as frames in a chronological order into the compression data storage section 134. Further, association of a position of a tile image in a frame of the original moving picture and compression data of each tile image sequence is carried out in advance. For example, identification information representative of a position is applied to the compression data of the tile image sequence. This makes it possible to specify necessary data from among the overall compression data of the moving picture.

Now, a technology for carrying out image display using data compressed by the method described hereinabove is described. Also an apparatus for carrying out image display in the present technology can be implemented by a configuration similar to that of the image processing apparatus 10 shown in FIG. 1. In the following, description is given principally of the configuration of the control part 100. FIG. 21 particularly depicts a configuration of a control part 100*b* having an image displaying function in the present embodiment. The image processing apparatus 10 including the control part 100*b* basically is an apparatus which carries out image display using at least part of moving picture data compressed in such a manner as described above. However, a purpose or a displaying mode for displaying a moving picture is not limited specially.

For example, the image processing apparatus 10 may display any of a movie or a picked up moving picture stored in the hard disk drive 50 or the like, a moving picture stream distributed on the real time basis, a video texture in computer graphics and so forth. Alternatively, a plurality of moving pictures may be displayed at the same time, or a moving picture may be used only in a partial region of a display image. Accordingly, in the hard disk drive 50, not only such compressed moving picture data as described above but also various data such as programs for implementing various functions and other image data may be stored.

The control part 100*b* includes an input information acquisition section 502, an information processing section 504, a loading section 506 and a display image processing section 508. The input information acquisition section 502 acquires information inputted by a user from the inputting apparatus 20. The information processing section 504 carries out information processing in response to an input by the user or the like. The loading section 506 loads necessary compression data of a moving picture. The display image processing section 508 renders an image frame.

The input information acquisition section 102 acquires starting/ending of a function provided by the image processing apparatus 10 and various kinds of input information accepted by the function, inputted to the inputting apparatus 20 by the user. The input information acquisition section 502 notifies the information processing section 504 of the acquired information. The function provided by the image processing apparatus 10 may be a moving picture displaying function or any of various functions of a game, communication and so forth. Accordingly, also the input information acquired by the input information acquisition section 502 differs variously depending upon the function.

In the present embodiment, random access to a moving picture in a space direction and a time direction is implemented readily. Accordingly, a mode for accepting an operation involving a change of a display region of a moving picture such as a viewpoint moving operation of the user for enlargement, reduction or scrolling of a moving picture being displayed or an operation for a game in which computer graphics to which a video texture is mapped are displayed is particularly effective.

The information processing section 504 carries out information processing in accordance with a function provided by the information processing apparatus based on input information acquired by the input information acquisition section 502. For example, when a viewpoint moving operation is accepted, the information processing section 504 determines a moving amount of the display region after every time step based on the operation amount of the viewpoint moving operation and sequentially calculates coordinates of a next display region. Where a game is to be executed, the information processing section 504 generates a three-dimensional object in accordance with the contents of the game or progresses the stage in accordance with a game program. Since the processes can be carried out by applying a common technology, the following description is given principally of processes relating to display of a moving picture while description of other processes is omitted suitably.

The information processing section 504 calculates frame coordinates of a display region in such a case that it becomes necessary to display a moving picture or it becomes necessary to change the display region of a moving picture as a result of carrying out such information processing as described above. The information processing section 504 then notifies the loading section 506 and the display image processing section 508 of the calculated frame coordinates. In the present embodiment, since individual compression data are generated in units of tile images or in units of a predetermined number of frames, also loading from the hard disk drive 50 into the main memory 60 can be carried out in this unit.

Therefore, the information processing section 504 measures the elapsed time from a point of time at which display of a moving picture is started and issues a notification of a frame number based on the elapsed time together with the information of the frame coordinates. Consequently, the loading section 506 and the display image processing section 508 can specify compression data of a loading target or a decoding target irrespective of whether or not the pertaining tile image has been a processing target till then. The loading section 506 confirms based on the notification from the information processing section 504 whether or not necessary compression data is stored in the main memory 60.

The necessary compression data here includes not only compression data necessary for next display but also compression data estimated to be required later. The latter data is data representative of, where the angle of view is fixed, a same display region and a region of a predetermined range around the same display region from within a frame later on the time axis. On the other hand, where the angle of view varies as a result of movement of the point of view or the like, the above-mentioned latter data is data representative of a display region of the destination of the movement predicted from the variation of the angle of view and a region of a predetermined range around the display region from within a later frame. If necessary data is not stored in the main memory 60, then the loading section 506 loads the compression data from the hard disk drive 50 and stores the compression data into the main memory 60.

The display image processing section 508 includes a data reading out portion 510, a decoding portion 512 and a rendering portion 514. The data reading out portion 510 specifies, based on frame coordinates received from the information processing section 504, compression data of a tile image sequence including data of a next display region from identification information for the compression data or the like. The data reading out portion 510 then reads out the specified compression data from the main memory 60. The decoding portion 512 specifies, based on the frame coordinates, the compression data of data blocks necessary for rendering from the pointer information included in the read out compression data and decodes the specified compression data.

Although this process basically is a process which follows the compression process described hereinabove reversely, restoration of pixel values can be carried out for every one of pixels which represent the display region. The rendering portion 514 uses the decoded data to render an entire display image in the frame memory of the display processing part 44. This process may be a process for rendering a display image configured from a region represented by the frame coordinates or may be a rendering process which includes a mapping process of a video texture.

Figure 22:
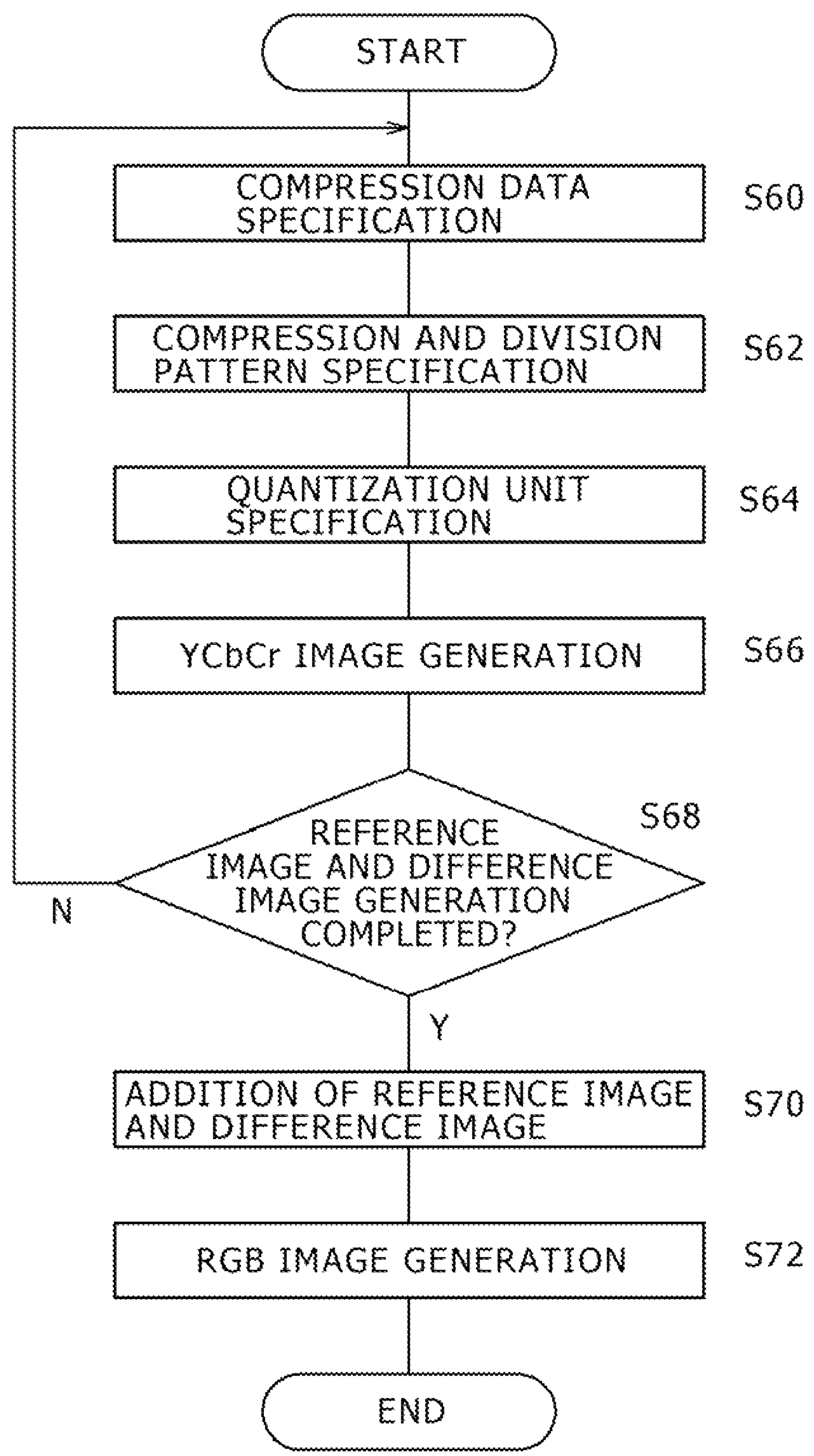
FIG. 22 is a flow chart illustrating a procedure of a decoding process carried out by a decoding portion in the present embodiment.

FIG. 22 is a flow chart illustrating a procedure of a decoding process carried out principally by the decoding portion 512. First, the decoding portion 512 refers to the pointer information for reference image data from within pointer information included in the read out compression data of the tile images to specify the compression data of a data block including data of a reference image necessary for rendering of a display region (S60). It is to be noted that, since the compression has been carried out in variable length as described hereinabove, a plurality of storage units may be pertinent.

Then, the decoding portion 512 reads out the pertinent compression data from the compression data of the reference image and acquires an identification number of four bits representative of a compression pattern and a division pattern based on a relationship in magnitude of two values represented by each of four pallets of a Y image included in the storage units (S62). Since a corresponding relationship between pixels configuring the display region and indexes included in the quantization units in the compression data can be discriminated from the identification number, the decoding portion 512 specifies a quantization unit which holds necessary data based on the corresponding relationship (S64).

Then, the decoding portion 512 acquires a value indicated by the index from four values obtained by linear interpolation of two values represented by the pallet to determine the Y value, Cb value and Cr value of each pixel. The decoding portion 512 then expands the CbCr image to twice in the vertical and horizontal directions to generate a YCbCr image. If one of the compression patterns has been used to carry out the compression, the decoding portion 512 expands the YCbCr image in the reverse direction or inserts a frame. The insertion of a frame can be carried out by copying an average image. Then, the decoding portion 512 further expands the YCbCr image to twice in the vertical and horizontal directions to generate a reference image for the YCbCr image of the original tile image size (S66). The expansion process at this time is carried out by interpolation and extrapolation so that the processing may be completed in a unit of 2×2 pixels as described hereinabove.

Next, the decoding portion 512 carries out similar processing for a difference image and generates a difference image of the YCbCr image from the compression data of the difference image (N at S68, S60 to S66). It is to be noted, however, that, at step S62, the identification information representative of a compression pattern and a division pattern is acquired from a relationship in magnitude of values obtained by connecting two values at the address of the preceding half and two values of the address of the succeeding half, respectively, of the four values represented by each of the four pallets of the Y image. When the Y value, Cb value and Cr value of each pixel are to be determined at step S66, the decoding portion 512 first converts the four values of four bits represented by the pallets into eight bits and multiplies the eight bits by a magnification based on identification information represented by a combination of relationships in magnitude of the two values of the preceding half address and the two values of the succeeding half address. Then, the decoding portion 512 acquires the value indicated by the index of each pixel to determine the Y value, Cb value and Cr value.

If the pointer indicates compression data for a NULL block, then the decoding portion 512 sets all pixels in the corresponding region to 0. It is to be noted, however, that, since this process can be carried out similarly for the other compression data by causing the compression data for a NULL block to have a same structure as that of the compression data of the other data blocks, no special process is required. After the YCbCr images of reference images and difference images individually representative of display regions are generated successfully (Y at S68), the decoding portion 512 adds them for the individually corresponding pixels (S70) and converts the color space into an RGB color space to generate an RGB image of the display region (S72).

Since compression data generated in the present embodiment have a variable length size of data corresponding to the individual data blocks, the pointer representative of a storage region of a storage unit needs to be indicated for each data block. As described above, for four frames of a tile image of 256×256 pixels, the number of pointers is totaling 1280 including 256 pointers of the reference images and 1024 pointers of the difference images. If one pointer is represented by UV coordinates of two bytes, the data size necessary for the pointer is (2 bytes×1280)/(256×256 pixels×4 frames)≈0.08 bits per one pixel of the original tile image and is very small.

With regard to the compression data, a data block for four frames is presented by one, two or four storage units of 4×2 pixels×4 bytes=32 bytes. Where the compression data is compressed at the highest compression rate, one data block can be represented by one storage unit of the reference image data and compression data for a NULL block of the difference image data. If it is taken into consideration that the reference image is obtained by reducing the original image to ¼ and that the compression data for a NULL block can be shared by others, the data size is (32 bytes×1×0.25+0 byte)/(8×8 pixels×4 frames)=0.25 bits per one pixel. On the other hand, where the compression data is compressed at the lowest compression rate, one data block is represented by four storage units of both the reference image data and the difference image data. Accordingly, the data size in this case is (32 bytes×4×0.25+32 bytes×4)/(8×8 pixels×4 frames)=5 bits per one pixel.

In short, the compression data generated and decoded by the present embodiment has a size of approximately 0.33 to 5.08 bits per one pixel. Since data texture-compressed by S3TC has a data size of four bits/pixel, compression data of a moving picture by the present embodiment has a size equivalent to or smaller than the data size just mentioned. As a result, a moving picture which can be randomly accessed in a space direction and a time direction can be displayed at a sufficiently low memory cost.

It is to be noted that the compression rate of compression data in the present embodiment varies in response to an actual image relating to a redundancy in time-space directions and likelihood of occurrence of quantization errors. On the other hand, by adjusting the threshold value which makes a reference for the decision of whether or not compression can be carried out in the time-space directions or whether or not conversion into a NULL block can be carried out, which arises from such factors as just mentioned, a drop of the compression rate arising from the image can be absorbed. By adaptively varying the threshold value in response to an apparatus environment and an image upon display, a moving picture can be displayed with maximum image quality while advantage of a given environment is taken. For example, a table which associates resource amounts or communication environments of the display apparatus and optimum threshold values with each other may be prepared in advance so that compression data is generated using a threshold value conforming to an actual display environment.

Although the number of moving picture data determined as a processing target in the foregoing description is one frame at each point of time, an image at each point of time may otherwise be configured from a plurality of frame sequences represented in different resolutions. If the frame sequence to be used is changed over in accordance with a viewpoint moving request from the user, the variation range of the resolution can be expanded significantly while a moving picture is applied. At this time, a plurality of frame sequences of different resolutions are hierarchized in a resolution order to establish a hierarchical structure. Moving picture data having such a hierarchical structure as just described are hereinafter referred to as "hierarchical data."

Figure 23:
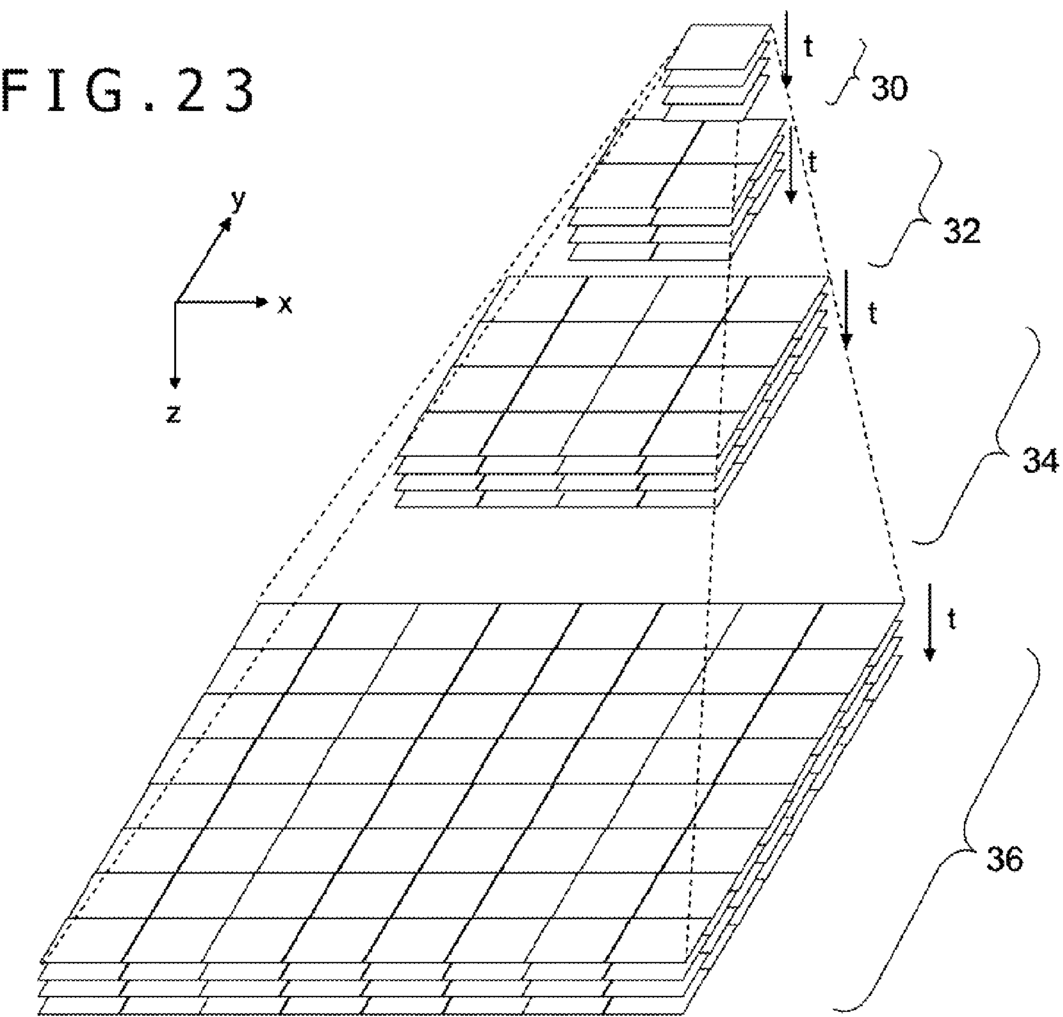
FIG. 23 is a view conceptually illustrating a data structure where a moving picture is configured from hierarchical data in the present embodiment.

FIG. 23 conceptually illustrates a data structure where a moving picture is represented by hierarchical data. The hierarchical data have a hierarchical structure configured from a 0th hierarchy 30, a first hierarchy 32, a second hierarchy 34 and a third hierarchy 36 in a z direction from the top to the bottom in FIG. 23. It is to be noted that, although only four hierarchies are depicted in FIG. 23, the number of hierarchies is not limited to this. As described hereinabove, each hierarchy is configured from a frame sequence in which frames in which one moving picture is represented by different resolutions are arranged in a chronological order. In FIG. 23, each hierarchy is represented symbolically by four frames. However, the number of frames naturally differs depending upon the reproduction time or the frame rate of the moving picture.

The hierarchical data have a hierarchical structure, for example, of a quad tree, and it is assumed that the 0th hierarchy 30 includes one tile image; the first hierarchy 32 includes 2×2 tile images; the second hierarchy 34 includes 4×4 tile images; and the third hierarchy includes 8×8 tile images. At this time, the resolution of the Nth hierarchy (N is an integer equal to or greater than 0) is ½ that of the (N+1)th hierarchy in both of the leftward and rightward (x-axis) direction and the upward and downward (y-axis) direction on the image plane. The hierarchical data can be generated by reducing each frame to a plurality of stages based on the moving picture of the third hierarchy 36 having the highest resolution or by a like process.

Viewpoint coordinates upon moving picture display and a corresponding display region can be represented by a virtual three-dimensional space configured from thexaxis representative of the leftward and rightward direction of the image, the y axis representative of the upward and downward direction and the z axis representative of the resolution as depicted in FIG. 23. It is to be noted that, since each hierarchy is configured from frame sequences individually representative of moving pictures, an image displayed actually relies also upon the time after the display is started, and in FIG. 23, a time axis t is represented for each hierarchy.

Basically, the image processing apparatus 10 sequentially renders frame sequences of one of the hierarchies along the time axis t at a predetermined frame rate. For example, a moving picture of the resolution of the 0th hierarchy 30 is displayed as a reference image. If, in the course of the display, a display region moving requesting signal is supplied from the inputting apparatus 20, then the image processing apparatus 10 derives a change amount of the display image from the signal and derives coordinates (frame coordinates) of the four corners of a next frame in the virtual space using the change amount. The image processing apparatus 10 then renders an image frame corresponding to the frame coordinates. Thereupon, a changeover boundary for a hierarchy is provided for the z axis so that the hierarchy of moving picture data to be used for frame rendering is changed over suitably in response to the z value of the frame coordinates.

For example, when the resolution required for a display image is between a changeover boundary between the first hierarchy 32 and the second hierarchy 34 and a changeover boundary between the second hierarchy 34 and the third hierarchy 36, the display region is rendered making use of the image data of the second hierarchy 34. At a resolution between the changeover boundary between the first hierarchy 32 and the second hierarchy 34 and the second hierarchy 34, the image frame of the second hierarchy 34 is displayed in a reduced scale. At a resolution between the changeover boundary between the second hierarchy 34 and the third hierarchy 36 and the second hierarchy 34, the image frame of the second hierarchy 34 is displayed in an expanded scale.

Hierarchical data are compressed in a unit of a tile image sequence into compressed data similarly as described hereinabove. It is to be noted that, in this case, the compression data of a tile image sequence is associated not only with a position on the image plane but also with a position in the resolution direction.

When such hierarchical data as described above are used to accept a moving request for a display region of a moving picture being displayed including expansion or reduction, if the data compression technology of the present embodiment is applied, then only compression data of a necessary tile image may be loaded and only a necessary region may be decoded. Therefore, in comparison with an alternative case in which an entire image is loaded or decoded, the waste is reduced in the cost for the loading process and the decoding process, the transfer cost and the memory cost. For example, when data of the third hierarchy 36 are used to carry out image display, since the display region is given using only a small portion of the data, the cost saving effect is particularly high. As a result, the processing can be progressed typically at an equal cost without depending upon the resolution for the display and smooth moving picture display can be achieved.

Further, when the hierarchy is to be changed over in accordance with a viewpoint moving request during display of a moving picture using hierarchical data, data for a next point of time needs to be acquired instantly with regard to a hierarchy after the changeover which has not been a decoding target till then. Since the compression data in the present embodiment are independent of each other for every predetermined number of frames such as every four frames, they are superior also in random accessibility in the time direction and such hierarchy changeover can be carried out seamlessly.

According to the present embodiment described above, tile images formed by dividing frames configuring a moving picture into a predetermined size are collected for a predetermined number of frames to form a tile image sequence. Further, compression data is generated in data block units obtained by spatially dividing the tile image sequence. This makes it possible to randomly access, in a loading process and a decoding process upon image display, the compression data in both of a space direction and a time direction. As a result, the cost for a loading process and a decoding process is reduced, and besides, since the deployment of an image on a memory is eliminated, also the memory cost is reduced.

In conventional moving picture compression technologies, when an image where a moving picture is mapped as a video texture is displayed, decoding of a moving picture which is not displayed needed to be continued in preparation for next display even if the texture region is very small or is displaced out of the angle of view by an operation of the user or the progress of the game. In the present embodiment, since only data corresponding to an actual display area may be processed, the processing efficiency can be improved significantly. Accordingly, the present embodiment is particularly effective where it is desired to synthesize a moving picture as a background of a game or a video such as an advertising sign of a stadium, a display, the sky or a remote landscape.

Further, not only a moving picture but also such image sequences as have a redundancy therebetween may be used as a compression target. For example, in data (Light Field data) picked up using a camera array, a redundancy can be expected between picked up images of adjacent ones of the cameras. Therefore, efficient compression of a moving picture wherein a plurality of picked up images are disposed on the time axis can be anticipated. Further, the present embodiment can be applied also to a technology (View Dependent Texture) for changing a texture image to be displayed in response to an angle with which an image looks. In other words, images which may possibly be displayed are compressed as a moving picture disposed on the time axis, and upon rendering, an arbitrary one of the images is randomly accessed and displayed.

Further, each tile image sequence is compressed separately for a reference image obtained by reduction of the tile image sequence and a difference image representative of a difference between an image obtained by decoding the compression data of the reference image and the original tile image. Each image is divided, after it is reduced in size or reduced in frame number confirming a redundancy thereof in a space direction and a time direction, into quantization units and then is quantized by representing each pixel value in a pallet and an index.

Although the concept of a pallet and an index is introduced by a compression method of S3TC, in the present embodiment, the two values of the pallet hold eight bits for any of the luminance Y, color difference Cb and color difference Cr, and therefore, the picture quality is less liable to degrade. Further, since quantization is carried out separately for a Y image sequence and a CbCr image sequence, the number of dimensions of parameters is small and the quantization error amount is small in comparison with those by quantization of three-dimensional parameters of RGB. Further, by changing the combination of a space division number and a time division number when coding units are formed, a data structure adapted to the redundancy in the space direction and the redundancy in the time direction which the image has can be provided flexibly.

Further, since the range of pixel values of the difference image is restrictive, if the pixel values can be regarded as 0, then the data block is treated as a NULL block so that the compression data are shared by a plurality of data blocks. Further, information relating to compression which utilizes a redundancy in a space direction and a time direction and a division pattern for forming quantization units is represented by comparison in magnitude of values held by a pallet of a Y image. From those, the compression rate can be improved as far as possible while the picture quality is maintained in response to an actual image. Further, upon image display, a rendering process can be carried out similarly as in processing for general texture mapping, and therefore, a high through-put can be expected. As a result, a high-definition moving picture can be displayed while the arithmetic operation cost and the memory cost are suppressed.

The present invention has been described in connection with the embodiment thereof. The embodiment described above is exemplary, and it can be recognized by those skilled in the art that various modifications are possible to the combinations of the components and the processing procedures of the embodiment and that such modifications remain within the scope of the present invention.

For example, in the present embodiment, a reference image obtained by reducing an original image by a predetermined magnification is generated and compressed and then included into final compression data. By using the reference image as it is, rendering for two levels of mipmap images can be carried out. Further, the compression rate may be improved further by raising the reduction rate of the reference image. At this time, mipmap images of three or more levels may be configured utilizing one reference image such that, for example, a mipmap image of a first level is configured from a reference image, a mipmap image of a second level is configured by expanding the mipmap image of the first level and adding the expanded mipmap image to a difference image, a mipmap image of a third level is configured by further expanding the reference image of the first level and adding the further expanded reference image to the difference image, and so forth.

In this case, compression units may be formed so that a reference image and a difference image can be handled independently of each other like a reference image of the first level, a difference image of the second level and a difference image of the third level. Further, the reference image of the first level may be utilized indirectly such that the image of the second level is used as the reference image of the third level. By this, an image rendering technology into which mipmaps are introduced can be implemented in a randomly accessible state and without increase of the data size.

REFERENCE SIGNS LIST

10 Image processing apparatus, 12 Display apparatus, 20 Inputting apparatus, 44 Display processing part, 50 Hard disk drive, 60 Main memory, 100 Control part, 120 Tile image sequence generation section, 122 Reference image compression section, 124 Difference image generation section, 126 Difference image compression section, 128 Compression data generation section, 130 Moving picture data storage section, 132 Division pattern storage section, 134 Compression data storage section, 502 Input information acquisition section, 504 Information processing section, 506 Loading section, 508 Display image processing section, 510 Data reading out portion, 512 Decoding portion, 514 Rendering portion

INDUSTRIAL APPLICABILITY

As described above, the present invention can be utilized for information processing apparatus such as a computer, an image processing apparatus, an image displaying apparatus and a game machine.

The invention claimed is:

1. A moving picture compression apparatus, comprising:

a tile image sequence generation section configured to generate a tile image sequence configured by dividing a frame sequence including a plurality of frame images sequentially positioned along a time axis, into a plurality of tile images, the frame sequence configuring moving picture data, the dividing of the frame sequence including dividing each frame image into a same number and spatial arrangement, on a respective image plane, of tile images, the tile image sequence being a subset of the tile images, the tile images in the subset being sequentially positioned along the time axis and each having a same spatial position on its respective image plane as the other tile images in the subset;

a reference image compression section configured to compress the tile image sequence to generate compression data of a reference image;

a difference image generation section configured to generate a difference image sequence configured from difference images which represent a difference between tile images configuring the tile image sequence and images obtained by decoding the compression data of the reference image generated by the reference image compression section and corresponding to the tile images;

a difference image compression section configured to compress the difference image sequence in units of data blocks obtained by dividing the difference image sequence on the image plane and a time axis to generate compression data of the difference images; and a compression data generation section configured to generate moving picture compression data including the compression data of the reference image and the compression data of the difference images in tile image units of a predetermined number of frames and output the moving picture compression data to a storage apparatus, wherein at least one of:

the reference image compression section generates, for each predetermined number of pixels of data blocks of the reference image obtained by dividing the reference image on the image plane and the time axis, a pallet which holds two values from among pixel values as representative values and an index which holds, in place of the pixel values, information which designates one of a plurality of intermediate values determined by linearly interpolating the representative values and the representative values to quantize the pixel values, and the difference image compression section generates, for each predetermined number of pixels of data blocks of the difference image, a pallet which holds four values obtained by multiplying four values which are representative values from among pixel values of the pixels by 1/N (N is a natural number) and an index which holds, in place of the pixel values, information which designates one of the four values held by the pallet to quantize the pixel values.

2. The moving picture compression apparatus according to claim 1, wherein:

the reference image compression section compresses the reference image in units of the data blocks obtained by dividing the reference image on the image plane and the time axis;

the reference image compression section and the difference image compression section reduce, when the sum total of differences of pixel values between images obtained by reducing once and then enlarging images included in the data blocks by a predetermined magnification and the original images is equal to or lower than a predetermined threshold value in the compression process, the images included in the data blocks by the pertaining magnification; and the compression data generation section includes pointer information for associating a position of each data block in the tile images and the compression data of the reference image and the difference images corresponding to the position with each other into the moving picture compression data.

3. The moving picture compression apparatus according to claim 2, wherein the reference image compression section and the difference image compression section replace, when the sum total of differences of pixel values between an image obtained by averaging the image sequence included in the data blocks for each predetermined number and the original images is equal to or lower than the predetermined threshold value in the compression process, the original images with the averaged image to decrease the number of images.

4. The moving picture compression apparatus according to claim 1, wherein:

the difference image compression section determines, when absolute values of pixel values configuring each data block are equal to or lower than a predetermined threshold value, all of the pixel values of the data block so as to be zero; and the compression data generation section associates the data block and the compression data with each other such that the compression data whose pixel values are zero is shared by a plurality of data blocks in the moving picture compression data.

5. The moving picture compression apparatus according to claim 1, wherein the difference image compression section represents an identification number representative of the magnification N to be multiplied by the values held by the pallet in order to restore the representative values by a magnitude relationship between and a storage order of the two values stored in a first half address from among the four values held by the pallet and a magnitude relationship between and a storage order of the two values stored in a latter half address.

6. The moving picture compression apparatus according to claim 1, wherein the reference image compression section and the difference image compression section represent an identification number for specifying a corresponding relationship between the index and a position of pixels of the original data block by a magnitude relationship between a value stored in the first half address and a value stored in the latter half address of the corresponding pallet.

7. The moving picture compression apparatus according to claim 1, wherein the difference image generation section performs, when the difference image generation section enlarges an image in the process for decoding the compression data of the reference image, interpolation and extrapolation in units equal to or smaller than an array of pixels in an image configured from the predetermined number of pixels which are the units when the pallet and the index are generated to generate new pixels.

8. An image processing apparatus, comprising:

an information processing section configured to successively calculate a frame to be displayed from within a frame sequence and a region to be displayed in the frame;

a loading section configured to load, from a storage apparatus in which moving picture compression data including compression data of a reference image obtained by compressing a tile image sequence obtained by dividing the frame sequence and compression data of a difference image representative of a difference between an image obtained by decoding the compression data of the reference image and the corresponding tile image are stored, the moving picture compression data in units of tile images into a memory based on the information calculated by the information processing section;

a display image processing section configured to read out, from within the moving picture compression data loaded in the memory, moving picture compression data calculated by the information processing section and including a region to be displayed from within the frame to be displayed and decode and add the compression data of the reference image and the compression data of the difference image to sequentially render an image of the region to be displayed; and a display section configured to sequentially display the rendered images, wherein the tile image sequence is configured by dividing the frame sequence, which includes a plurality of frame images sequentially positioned along a time axis, into a plurality of tile images, the frame sequence configuring moving picture data, the dividing of the frame sequence including dividing each frame image into a same number and spatial arrangement, on a respective image plane, of tile images, the tile image sequence being a subset of the tile images, the tile images in the subset being sequentially positioned along the time axis and each having a same spatial position on its respective image plane as the other tile images in the subset, and wherein at least one of:

(i) the compression data of the difference image is configured, for each predetermined number of pixels, from a pallet which holds four values obtained by multiplying four values which are representative values from among pixel values of the pixels by 1/N (N is a natural number) and an index which holds, in place of a pixel value, information which designates one of the four values held by the pallet, and the display image processing section specifies an identification number representative of the magnification N to be multiplied by the values held by the pallet in order to restore the representative values from a magnitude relationship between and a storage order of the two values stored in a first half address from among the four values held by the pallet and a magnitude relationship between and a storage order of the two values stored in a latter half address to restore the representative values; and (ii) the compression data of the reference image and the compression data of the difference image are data obtained by quantizing pixel values for each predetermined number of pixels, and when an image is to be enlarged in the process for decoding the compression data of the reference image and the compression data of the difference image, the display image processing section carries out interpolation and extrapolation in units equal to or smaller than an array of pixels in an image configured from the predetermined number of pixels which are the units when the quantization is carried out to generate new pixels.

9. The image processing apparatus according to claim 8, wherein:

the compression data of the reference image and the compression data of the difference image are data compressed in variable length in units of data blocks obtained by dividing the compression data on the image plane and a time axis; and the display image processing section refers to pointer information included in the moving picture compression data and associating a position of each data block in the tile image and the compression data of the reference image and the compression data of the difference image corresponding to the position with each other to specify the compression data of the reference image and the compression data of the difference image of the data block corresponding to the region to be displayed.

10. The image processing apparatus according to claim 8, wherein the display image processing section specifies an identification number for specifying a corresponding relationship between the index and the position of the original pixel in the compression data of the difference image from a magnitude relationship of a value stored in the first half address and a value stored in the latter half address of the corresponding pallet and specifies the index of the pixels which configure the region to be displayed based on the specified identification number.

11. A moving picture compression method, comprising:

by a moving picture compression apparatus, generating a tile image sequence configured by dividing a frame sequence, which is stored in a storage apparatus and includes a plurality of frame images sequentially positioned along a time axis, into a plurality of tile images, the frame sequence configuring moving picture data, the dividing of the frame sequence including dividing each frame image into a same number and spatial arrangement, on a respective image plane, of tile images, the tile image sequence being a subset of the tile images, the tile images in the subset being sequentially positioned along the time axis and each having a same spatial position on its respective image plane as the other tile images in the subset;

compressing the tile image sequence to generate compression data of a reference image;

generating a difference image sequence configured from difference images which represent a difference between tile images which configure the tile image sequence and images obtained by decoding the compression data of the generated reference image and corresponding to the tile images;

compressing the difference image sequence in units of data blocks obtained by dividing the difference image sequence on the image plane and a time axis to generate compression data of the difference images; and generating moving picture compression data including the compression data of the reference image and the compression data of the difference images in tile image units of a predetermined number of frames and outputting the moving picture compression data to the storage apparatus, wherein at least one of:

compressing step generates, for each predetermined number of pixels of data blocks of the reference image obtained by dividing the reference image on the image plane and the time axis, a pallet which holds two values from among pixel values as representative values and an index which holds, in place of the pixel values, information which designates one of a plurality of intermediate values determined by linearly interpolating the representative values and the representative values to quantize the pixel values, and the compressing the difference image sequence step includes generating, for each predetermined number of pixels of data blocks of the difference image, a pallet which holds four values obtained by multiplying four values which are representative values from among pixel values of the pixels by 1/N (N is a natural number) and an index which holds, in place of the pixel values, information which designates one of the four values held by the pallet to quantize the pixel values.

12. An image processing method, comprising:

by an image processing apparatus, successively calculating a frame to be displayed from within a frame sequence and a region to be displayed in the frame;

loading, from a storage apparatus in which moving picture compression data including compression data of a reference image obtained by compressing a tile image sequence obtained by dividing the frame sequence and compression data of a difference image representative of a difference between an image obtained by decoding the compression data of the reference image and the corresponding tile image are stored, the moving picture compression data in units of tile images into a memory based on the information calculated by the calculating step;

reading out, from within the moving picture compression data loaded in the memory, moving picture compression data calculated by the calculating step and including a region to be displayed from within the frame to be displayed and decoding and adding the compression data of the reference image and the compression data of the difference image to sequentially render an image of the region to be displayed; and sequentially displaying the rendered images, wherein the tile image sequence is configured by dividing the frame sequence, which includes a plurality of frame images sequentially positioned along a time axis, into a plurality of tile images, the frame sequence configuring moving picture data, the dividing of the frame sequence including dividing each frame image into a same number and spatial arrangement, on a respective image plane, of tile images, the tile image sequence being a subset of the tile images, the tile images in the subset being sequentially positioned along the time axis and each having a same spatial position on its respective image plane as the other tile images in the subset, and wherein at least one of:

(i) the compression data of the difference image is configured, for each predetermined number of pixels, from a pallet which holds four values obtained by multiplying four values which are representative values from among pixel values of the pixels by 1/N (N is a natural number) and an index which holds, in place of a pixel value, information which designates one of the four values held by the pallet, and the reading out step includes specifying an identification number representative of the magnification N to be multiplied by the values held by the pallet in order to restore the representative values from a magnitude relationship between and a storage order of the two values stored in a first half address from among the four values held by the pallet and a magnitude relationship between and a storage order of the two values stored in a latter half address to restore the representative values; and (ii) the compression data of the reference image and the compression data of the difference image are data obtained by quantizing pixel values for each predetermined number of pixels, and when an image is to be enlarged in the process for decoding the compression data of the reference image and the compression data of the difference image, the reading out step includes carrying out interpolation and extrapolation in units equal to or smaller than an array of pixels in an image configured from the predetermined number of pixels which are the units when the quantization is carried out to generate new pixels.

13. A non-transitory, computer-readable storage medium containing a computer program for a computer, which when executed by the computer causes the computer to carry out actions, comprising:

generating a tile image sequence configured by dividing a frame sequence, which is stored in a storage apparatus and includes a plurality of frame images sequentially positioned along a time axis, into a plurality of tile images, the frame sequence configuring moving picture data, the dividing of the frame sequence including dividing each frame image into a same number and spatial arrangement, on a respective image plane, of tile images, the tile image sequence being a subset of the tile images, the tile images in the subset being sequentially positioned along the time axis and each having a same spatial position on its respective image plane as the other tile images in the subset;

compressing the tile image sequence to generate compression data of a reference image;

generating a difference image sequence configured from difference images which represent a difference between tile images which configure the tile image sequence and images obtained by decoding the compression data of the generated reference image and corresponding to the tile images;

compressing the difference image sequence in units of data blocks obtained by dividing the difference image sequence on the image plane and the time axis to generate compression data of the difference images; and generating moving picture compression data including the compression data of the reference image and the compression data of the difference images in tile image units of a predetermined number of frames and outputting the moving picture compression data to the storage apparatus, wherein at least one of:

compressing step generates, for each predetermined number of pixels of data blocks of the reference image obtained by dividing the reference image on the image plane and the time axis, a pallet which holds two values from among pixel values as representative values and an index which holds, in place of the pixel values, information which designates one of a plurality of intermediate values determined by linearly interpolating the representative values and the representative values to quantize the pixel values, and the compressing the difference image sequence step includes generating, for each predetermined number of pixels of data blocks of the difference image, a pallet which holds four values obtained by multiplying four values which are representative values from among pixel values of the pixels by 1/N (N is a natural number) and an index which holds, in place of the pixel values, information which designates one of the four values held by the pallet to quantize the pixel values.

14. A non-transitory, computer-readable storage medium containing a computer program for a computer, which when executed by the computer causes the computer to carry out actions, comprising:

successively calculating a frame to be displayed from within a frame sequence and a region to be displayed in the frame;

loading, from a storage apparatus in which moving picture compression data including compression data of a reference image obtained by compressing a tile image sequence obtained by dividing the frame sequence and compression data of a difference image representative of a difference between an image obtained by decoding the compression data of the reference image and the corresponding tile image are stored, the moving picture compression data in units of tile images into a memory based on the calculated information;

reading out, from within the moving picture compression data loaded in the memory, calculated moving picture compression data including a region to be displayed from within the frame to be displayed and decoding and adding the compression data of the reference image and the compression data of the difference image to sequentially render an image of the region to be displayed; and sequentially displaying the rendered images, wherein the tile image sequence is configured by dividing the frame sequence, which includes a plurality of frame images sequentially positioned along a time axis, into a plurality of tile images, the frame sequence configuring moving picture data, the dividing of the frame sequence including dividing each frame image into a same number and spatial arrangement, on a respective image plane, of tile images, the tile image sequence being a subset of the tile images, the tile images in the subset being sequentially positioned along the time axis and each having a same spatial position on its respective image plane as the other tile images in the subset, and wherein at least one of:

(i) the compression data of the difference image is configured, for each predetermined number of pixels, from a pallet which holds four values obtained by multiplying four values which are representative values from among pixel values of the pixels by 1/N (N is a natural number) and an index which holds, in place of a pixel value, information which designates one of the four values held by the pallet, and the reading out step includes specifying an identification number representative of the magnification N to be multiplied by the values held by the pallet in order to restore the representative values from a magnitude relationship between and a storage order of the two values stored in a first half address from among the four values held by the pallet and a magnitude relationship between and a storage order of the two values stored in a latter half address to restore the representative values; and (ii) the compression data of the reference image and the compression data of the difference image are data obtained by quantizing pixel values for each predetermined number of pixels, and when an image is to be enlarged in the process for decoding the compression data of the reference image and the compression data of the difference image, the reading out step includes carrying out interpolation and extrapolation in units equal to or smaller than an array of pixels in an image configured from the predetermined number of pixels which are the units when the quantization is carried out to generate new pixels.

15. A non-transitory, computer-readable storage medium containing a data structure of a moving picture compression file, wherein compression data of a reference image obtained by compressing tile images, which configure a tile image sequence obtained by dividing a frame sequence, in units of data blocks obtained by dividing the tile images on the image plane and a time axis and compression data of a difference image obtained by compressing a difference image sequence, which is configured from difference images representative of a difference between an image obtained by decoding the compression data of the reference image and the corresponding tile image, in units of data blocks obtained by dividing the difference image sequence on the image plane and the time axis, are associated with each other in units of tile images of a predetermined number of frames; and in an image processing apparatus, the compression data of the reference image and the compression data of the difference image of the data block loaded in the tile image units based on information of the frame to be displayed and a region to be displayed in the frame and corresponding to the region to be displayed from within the frame to be displayed are decoded and added to be used to sequentially render an image of the region to be displayed, wherein the tile image sequence is configured by dividing the frame sequence, which includes a plurality of frame images sequentially positioned along the time axis, into a plurality of tile images, the frame sequence configuring moving picture data, the dividing of the frame sequence including dividing each frame image into a same number and spatial arrangement, on a respective image plane, of tile images, the tile image sequence being a subset of the tile images, the tile images in the subset being sequentially positioned along the time axis and each having a same spatial position on its respective image plane as the other tile images in the subset, and wherein at least one of:

(i) the compression data of the difference image is configured, for each predetermined number of pixels, from a pallet which holds four values obtained by multiplying four values which are representative values from among pixel values of the pixels by 1/N (N is a natural number) and an index which holds, in place of a pixel value, information which designates one of the four values held by the pallet, an identification number representative of the magnification N to be multiplied by the values held by the pallet is specified in order to restore the representative values from a magnitude relationship between and a storage order of the two values stored in a first half address from among the four values held by the pallet and a magnitude relationship between and a storage order of the two values stored in a latter half address to restore the representative values; and (ii) the compression data of the reference image and the compression data of the difference image are data obtained by quantizing pixel values for each predetermined number of pixels, and when an image is to be enlarged in the process for decoding the compression data of the reference image and the compression data of the difference image, interpolation and extrapolation in units equal to or smaller than an array of pixels is carried out in an image configured from the predetermined number of pixels which are the units when the quantization is carried out to generate new pixels.

* * * * *